(12) United States Patent
Hyde et al.

(10) Patent No.: US 8,610,038 B2
(45) Date of Patent: Dec. 17, 2013

(54) MICROWAVE OVEN

(75) Inventors: Roderick A. Hyde, Bellevue, WA (US);
Muriel Y. Ishikawa, Livermore, CA
(US); Edward K. Y. Jung, Seattle, WA
(US); Nathan P. Myhrvold, Kirkland,
WA (US); Clarence T. Tegreene,
Redmond, WA (US); **Lowell L. Wood,
Jr.**, Bellevue, WA (US)

(73) Assignee: The Invention Science Fund I, LLC,
Bellevue, WA (US)

( * ) Notice: Subject to any disclaimer, the term of this
patent is extended or adjusted under 35
U.S.C. 154(b) by 1242 days.

(21) Appl. No.: 12/184,248

(22) Filed: Jul. 31, 2008

(65) Prior Publication Data

US 2009/0321427 A1    Dec. 31, 2009

Related U.S. Application Data

(63) Continuation-in-part of application No. 12/217,139,
filed on Jun. 30, 2008.

(51) Int. Cl.
*H05B 6/68* (2006.01)
*H05B 6/72* (2006.01)

(52) U.S. Cl.
USPC .......................... 219/702; 219/710; 219/716

(58) Field of Classification Search
USPC ......... 219/702, 716, 720, 761, 518, 680, 685,
219/690, 695, 704, 705, 709, 745, 746, 749,
219/750, 756, 757, 710; 333/159, 209,
333/224–226, 232–233
See application file for complete search history.

(56) References Cited

U.S. PATENT DOCUMENTS

| | | |
|---|---|---|
| 3,783,373 A | 1/1974 | Jawor |
| 4,196,332 A | 4/1980 | MacKay et al. |
| 4,323,773 A | 4/1982 | Carpenter |
| 4,341,937 A | 7/1982 | Staats |
| 4,520,250 A | 5/1985 | Ishihara et al. |
| 4,771,153 A | 9/1988 | Fukushima et al. |

(Continued)

FOREIGN PATENT DOCUMENTS

WO    WO 2008/018466 A1    2/2008

OTHER PUBLICATIONS

Climate and Global Dynamics Division (CGD); "Optical Depth," located at http://www.cgd.ucar.edu/~zender/rt/node12.html; bearing a date of Mar. 5, 1999; pp. 1-2; printed on Sep. 27, 2004.

(Continued)

*Primary Examiner* — Quang Van

(57) ABSTRACT

Generally and not exclusively, a microwave cooking oven to cook food in a microwave chamber includes at least one array of radiation detectors. An exemplary method includes sensing an optical depth of the item along each of multiple beam paths from at least two sides of the item, and mapping isothermal regions in the interior of the item 3-dimensionally based on the sensing. Another exemplary method includes sensing a microwave power representing a value of a heatability property for each of multiple regions of the same item, and applying a different measure of the microwave power to each of the different regions according to the value of the heatability property in each individual region. Yet another exemplary method includes sensing different frequencies of the microwave power in the microwave chamber, and changing the frequency of the microwave power for heating the item, as the item undergoes heating.

54 Claims, 17 Drawing Sheets

(56) References Cited

U.S. PATENT DOCUMENTS

| | | | |
|---|---|---|---|
| 4,831,239 A * | 5/1989 | Ueda | 219/518 |
| 4,945,216 A | 7/1990 | Edamura | |
| 5,134,263 A * | 7/1992 | Smith et al. | 219/682 |
| 5,254,819 A | 10/1993 | Yoshino et al. | |
| 5,321,232 A | 6/1994 | Ogle | |
| 5,426,280 A | 6/1995 | Smith | |
| 5,521,360 A | 5/1996 | Johnson et al. | |
| 5,645,748 A | 7/1997 | Schiffmann et al. | |
| 5,829,341 A | 11/1998 | Lin | |
| 5,938,966 A | 8/1999 | Oh et al. | |
| 6,080,972 A | 6/2000 | May | |
| 6,132,084 A | 10/2000 | Whipple, III et al. | |
| 6,274,859 B1 * | 8/2001 | Yoshino et al. | 219/746 |
| 6,462,320 B1 | 10/2002 | Fuls et al. | |
| 6,469,286 B1 * | 10/2002 | Nobue et al. | 219/746 |
| 6,552,309 B1 | 4/2003 | Kish et al. | |
| 6,630,655 B2 | 10/2003 | Fukunaga et al. | |
| 6,884,979 B1 | 4/2005 | Torngren et al. | |
| 7,952,511 B1 | 5/2011 | Geer | |
| 2005/0021285 A1 | 1/2005 | Troxler et al. | |
| 2006/0288796 A1 | 12/2006 | Giazotto | |
| 2007/0255141 A1 | 11/2007 | Esenaliev et al. | |
| 2008/0249738 A1 | 10/2008 | Troxler | |
| 2008/0264934 A1 | 10/2008 | Moreira et al. | |
| 2010/0176121 A1 | 7/2010 | Nobue et al. | |
| 2011/0031236 A1 | 2/2011 | Ben-Shmuel et al. | |

OTHER PUBLICATIONS

Lorenz, Ralph D.; "Rapid Communication—Calorimetric Radar Absorptivity Measurement Using a Microwave Oven," Meas. Sci. Technol.; vol. 10 (1999); pp. L-29-L32; bearing dates of Feb. 16, 1999, Mar. 29, 1999 and Apr. 1, 1999; IOP Publishing Ltd.

Osepchuck, John M., "A History of Microwave Heating Applications," IEEE Transactions on Microwave Theory and Techniques, vol. MIT 32, No. 9, bearing a date of Sep. 1984; pp. 1200-1224.

Wolfram Research; "Optical Depth—from Eric Weisstein's World of Physics" pp. 1-2; located at; http://scienceworld.wolfram.com/physics/OpticalDepth.html ; printed on Sep. 27, 2004.

U.S. Appl. No. 12/221,449, Hyde et al.

U.S. Appl. No. 12/587,993, Hyde et al.

* cited by examiner

MICROWAVE OVEN

CROSS REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

1. For purposes of the USPTO extra-statutory requirements, the present application constitutes a continuation-in-part of U.S. patent application Ser. No. 12/217,139 entitled MICROWAVE OVEN filed on Jun. 30, 2008 under Attorney Docket number 0204-020-001-000000 (SE1-0045-US), and naming Roderick A. Hyde, Muriel Y. Ishikawa, Edward K. Y. Jung, Nathan P. Myhrvold, Clarence T. Tegreene, and Lowell L. Wood, Jr. as inventors, which is currently co-pending, or is an application of which a currently co-pending application is entitled to the benefit of the filing date.

The United States Patent and Trademark Office (USPTO) has published a notice to the effect that the USPTO's computer programs require that patent applicants both reference a serial number and indicate whether an application is a continuation or continuation in part. Stephen G. Kunin, Benefit of Prior-Filed Application, USPTO Electronic Official Gazette, Mar. 18, 2003. The present applicant entity has provided a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s). All subject matter of the Related Applications and of any and all parent, grandparent, great-grandparent, etc. applications of the Related Applications is incorporated herein by reference to the extent such subject matter is not inconsistent herewith.

TECHNICAL FIELD

This invention relates generally to a microwave oven, and more particularly but not exclusively to an apparatus and method for dynamically sensing microwave radiation interacting with an item to be heated, modeling the interaction between the item and the microwave radiation, and adjusting the heating of the item based on the model.

BACKGROUND

A microwave oven heats objects, such as food. It may be surmised that a person operating the microwave oven does not know the object temperature or cooking state, and controls the microwave oven by guessing at the temperature or cooking state, or by operating the microwave power arbitrarily.

SUMMARY

Generally and not exclusively, a microwave oven to heat objects in a cooking chamber includes a microwave power source, and a microwave control unit. In one illustrative embodiment, the control unit includes one or more radiation detectors for sensing a level of microwave power in a microwave chamber, a modeling engine for tracking a relationship between the sensed level of the microwave power and a heatability property of an item in the microwave chamber, and a controller for dynamically managing the microwave power emitted by a microwave source to the microwave chamber based on a signal from the modeling engine.

In one implementation an exemplary method includes emitting microwave power to a microwave chamber, dynamically sensing the microwave power in the microwave chamber at an array of locations in the microwave chamber, modeling a relationship between the sensed microwave power and a heatability property of an item in the microwave chamber, and controlling the emitting of the microwave power based on the modeling.

In one implementation, an exemplary method includes emitting a first measure of the microwave power to the microwave chamber for a first interval, turning off the emitting, for a second interval, sensing a second measure of the microwave power as an emission of radiation from the item, wherein the microwave power absorbed by the item spontaneously radiates from the item, and mapping isothermal regions of the item based on the sensed microwave power.

In one implementation, an exemplary method includes sensing an optical depth of the item along each of multiple beam paths from at least two sides of the item, and mapping isothermal regions in the interior of the item 3-dimensionally based on the sensing.

In one implementation, an exemplary method includes sensing a microwave power representing a value of a heatability property for each of multiple regions of the same item, and applying a different measure of the microwave power to each of the different regions according to the value of the heatability property in each individual region.

In one implementation, an exemplary method includes emitting microwave power to a microwave chamber, dynamically sensing the microwave power in the microwave chamber at an array of locations in the microwave chamber, modeling a relationship between the sensed microwave power and a heatability property of an item in the microwave chamber, and modifying the sensing of the microwave power based on the modeling.

In one implementation, an exemplary method includes sensing different frequencies of the microwave power in the microwave chamber, modeling a microwave absorptivity versus frequency relationship for a given item being heated, selecting one of the frequencies of the microwave power for heating the item, based on the modeling, detecting a change in the absorptivity as the item is heated; and changing the frequency of the microwave power for heating the item, based on the modeling.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advan-

DETAILED DESCRIPTION

Figure 1:
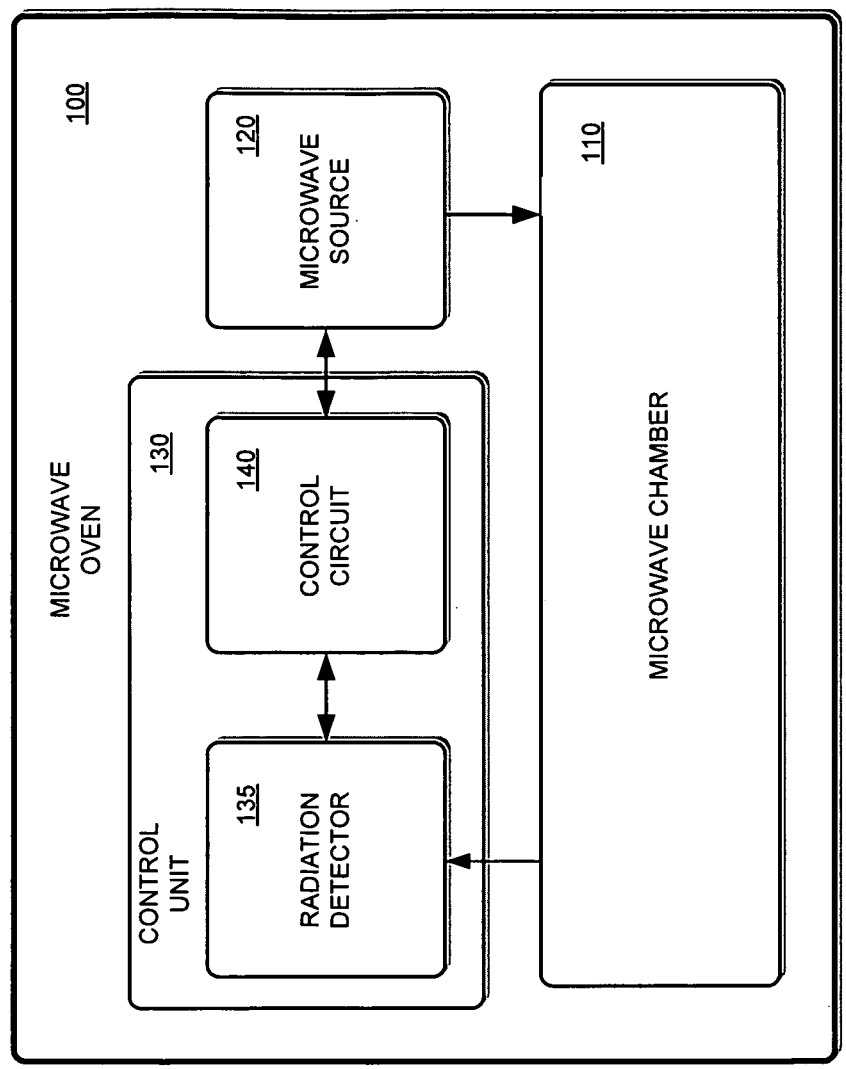
FIG. 1 is a block diagram of an embodiment of a microwave oven showing a cooking chamber, a microwave source, and a control circuit having a radiation detector, and a control circuit.

Referring to FIG. 1, there is shown a block diagram of an embodiment of a microwave oven 100. The microwave oven 100 includes a microwave chamber 110 (e.g., a cooking chamber) to enclose an object to be heated by the microwave oven 100. While the exemplary embodiment relates to a food object and the central enclosure is referred to as a microwave chamber 110, this is only exemplary. In other applications, the object may be water to be heated, an item to be dried, an inanimate thermal mass that may be applied as a therapeutic heat pack, an item to store and controllably release heat or other energy, such as a handwarmer, or any other item for which such heating may be desired. Additionally, the approaches herein may be applied to situations where increasing the item's temperature is not an objective of or not the only objective of applying microwave energy. For example, such microwave application may be desirable to initiate chemical or other interactions, increase plasticity, induce chemical breakdown, or produce other reactions in the item in the chamber 110.

The microwave chamber 110 is operationally coupled to both a microwave source 120, and to a radiation detector 135, for example, in one implementation the microwave chamber 110 is coupled to an array of microwave sensors that constitute the radiation detector 135, via a detector array multiplexor 137 and frequency filters 139. The microwave source 120 and the radiation detector 135 are each operationally coupled to a control circuit 140. The radiation detector 135 and control circuit 140 are components of a control unit 130. The microwave source 120 is configured to emit microwave radiation into the microwave chamber 110 from at least one position, and to emit the microwave radiation into the microwave chamber 110 in response to a control signal from the control circuit 140. The radiation detector 135 is configured to detect the microwave power within the microwave chamber 110 from at least one position, and to provide an indication of the detected microwave power to the control circuit 140. In one implementation, the radiation detector 135 is a microwave detector.

The microwave source 120 in operation transforms input electrical power into microwave power that is emitted into the microwave chamber 110. In one implementation, the microwave source 120 includes a power supply, a microwave generator, and a microwave transmission system. The power supply is configured to draw electrical power from a line, convert the electrical power into a form required by the microwave generator, and to provide the converted electrical power to the microwave generator. The microwave generator, typically a magnetron, generates microwaves from the provided electrical power. The microwave transmission system transfers the generated microwaves into the microwave chamber 110. The transmission system may include a device, typically a microwave stirrer, to cause the object to be heated more uniformly by distributing the microwave radiation emitted into the microwave chamber 110 more uniformly, and reducing standing waves within the microwave chamber 110. In one implementation, a rotatable support for the object is disposed within the microwave chamber 110 in place of, or in addition to, the stirrer within the microwave chamber 110. In one implementation, a load-bearing belt moves through a conveyorized oven of one or more cavities. In one implementation, the power generated by the microwave generator is controlled by adjusting the magnitude of the voltage, or the duty cycle of the voltage, provided to the microwave generator. The microwave source 120 is operationally coupled to the control circuit 140. In one implementation, the control circuit 140 provides to the microwave source a signal indicating the power the microwave source should emit into the microwave chamber 110. A radiation control mechanism (not shown) of the microwave source 120 is configured to control the power emitted by the microwave source 120 as indicated by the control circuit 140. In one implementation, the microwave source 120 is configured to provide to the control circuit 140 a signal indicating the power of the microwave power emitted into the microwave chamber 110 by the microwave source 120.

The radiation detector 135 in this implementation is configured to transform detected microwave power in the microwave chamber 110 into a radiation detector signal indicative of the microwave power within the microwave chamber 110. Broadly, in one implementation the radiation detector 135 includes a receiving element to transduce sensed radiation power, here microwave power, into an electrical signal, and a signal conditioning element to provide an electrical signal to the control circuit 140 indicative of the sensed microwave power. In one implementation, the receiving element includes a diode detector to transduce the radiation power. In one implementation, the signal conditioning element is a component of the control circuit 140.

The control circuit 140 is configured to determine the extent to which the object is heated/is cooked based on the microwave power that the object is absorbing/has absorbed. Before describing the structure of the control circuit 140 in greater detail, a framework for relating the extent to which the object is heated to absorbed microwave power is described.

Microwave power may be heuristically understood to increase the temperature of irradiated objects as the microwave power is absorbed by the objects, by polar and/or ionic interaction of the objects with the microwave power. This interaction results in a movement of the power absorbing molecules and/or atoms in the object to generate frictional heat. For food, the most significant absorbing food constituent is usually water, whose molecules are excited by polar interaction to align with the applied oscillating microwave field. This alignment action results in collisions with neighbors, generating frictionally produced thermal energy.

An analytical and empirical functional relationship has been posited between the heat absorbed by a material at a given temperature, and the microwave power absorbed by the material. The microwave power absorbed by the material is posited to be related to its optical depth (or optical thickness). The functional relationship is posited to be approximately linear for small optical depths. For example, for a plane-parallel sample geometry with thickness t and surface area A, the posited relationship can be shown analytically by the formula $$P = I * A * F * (1 - e^{-\alpha * t}) \quad (1)$$

where P is the absorbed power of the material,
I is the incident irradiating power density,
F is an edge reflection correction factor,
α is the sample radiation absorptivity, and
* is the multiplication operator.

Similar relationships can be determined for samples with arbitrary shape (non-plane-parallel sample geometry), but the foregoing relationship can generally be employed as an approximation sufficient for engineering purposes. The power P absorbed by the sample will generally be proportional to $1-e^{-\alpha t}$. Material optical depth is indicated by $\alpha t$. For a sufficiently small optical depth $\alpha t$, $1-e^{-\alpha t}$ is approximately $\alpha t$, and the absorbed power of the material at a given temperature is approximately linear with respect to optical depth. For sufficiently small optical depths, the absorbed power is proportional to the incident irradiating power density, the absorbing volume, and the absorptivity α, even for non-plane-parallel geometries.

An analytical and empirical inverse relationship has been posited to exist between a material's absorptivity (and hence its optical depth for a given configuration) and its temperature at a given incident microwave power. For food, the functional relationship is posited to be approximately inversely linear over the range of liquid food states. Absorptivity is empirically and analytically related to sample load factor (loss tangent δ). This relationship is moreover posited to be approximately linear for most foods at temperatures of interest. Load factor is defined as $\in''/\in'$, where $\in'$ is the real part of a material's dielectric constant (known also as the permittivity) and $\in''$ is the imaginary part of the material's dielectric constant (known also as the dielectric loss factor). Because $\alpha = (2\pi\in'')/(\lambda\in'^{.5})$ where λ is the free space wavelength of the absorbed microwave radiation, the load factor therefore varies approximately linearly with optical depth. It is understood that there is an inverse functional relationship between load factor and temperature for incident radiation over a range of liquid food states, and that this relationship is moreover approximately an inverse linear relationship.

Thus, it is posited that, as a food cooks, or an object heats, in a microwave oven, the microwave optical depth (or load factor) of the food decreases, and the power absorbed by the food decreases. Relative changes in optical depth may be measured by measuring the relative power absorbed by the food. There is posited to be a relationship between the power detected by the radiation detector 135 and the power absorbed by the food that can be roughly described in the following equation:

$$P_{ABSORBED} = K_1 * (P_{MSOURCE} - P_{MDETECTOR}) \quad (2)$$

where $P_{ABSORBED}$ is the power absorbed by the food
$P_{MDETECTOR}$ is the power in the microwave chamber 110 sensed by the radiation detector 135,
$P_{MSOURCE}$ is the power emitted into the microwave chamber 110 by the microwave source 120, and
$K_1$ is a constant accounting for effects such as other microwave chamber absorbers.

In view of the foregoing, and using equation (1) above, the optical depth may be expressed as:

$\alpha t = -ln(1 - (P_{ABSORBED}/K_2))$ where $K_2$ is a constant involving the incident power and reflection effects. In the plane-parallel configuration of Equation 1, $$K_2 = I A F. \quad (3)$$

Recall that above it was stated that "material optical depth is indicated by αt." Thus, it is posited that, by knowing the microwave power in the microwave chamber that is generally sensed by the radiation detector 135, and the power emitted into the microwave chamber 110, the power absorbed by the food can be determined, and hence the microwave optical depth—or αt—of the food in the microwave oven 100 can be estimated. Utilizing the posited inverse relationship between food temperature and optical depth, the temperature of the food and/or the extent to which the food is cooked can therefore be at least approximately determined/inferred from that estimated optical depth. In one implementation, it is posited that the relationship between optical depth and temperature may be known by consultation of a look-up table, where the look-up table contains the results of empirical trials which correlate optical depth and temperature for defined food substances. An example of such a look-up table entry might state that a ¼ lb. beef patty of 7% fat having an inferred optical depth of N millimeters would typically indicate 90 degrees Fahrenheit and/or would typically indicate that the ¼ lb. beef patty has been cooked to "rare". Once again, although the example provided here relates to food objects and cooking, other objects may be heated according to this approach.

The control circuit 140 determines the extent to which the food is cooked as a function of the microwave power the food sample is inferred to be absorbing/has absorbed (e.g., via a processor programmed to carry out Equation 2, above). In one implementation, the microwave power that the food is absorbing is determined by the control circuit 140 from the difference between the microwave power emitted by the microwave source 120 into the microwave chamber 110, and the microwave power in the microwave chamber 110. The microwave power emitted by the microwave source 120 into the microwave chamber 110 is indicated to the control circuit 140 by a sensing of the microwave source 120, such as the voltage or the duty cycle of the microwave source power supply. The microwave power in the microwave chamber 110 is indicated to the control circuit 140 by the microwave power sensed by the radiation detector 135 indicated by the radiation detector signal. In one implementation, the indicated microwave power emitted by the microwave source 120 into the microwave chamber 110 and/or the indicated microwave power in the microwave chamber 110, are adjusted for the particular characteristics of the microwave oven 100.

In one implementation, as more fully described with reference to FIG. 3 below, the microwave oven 100 has multiple microwave emitter ports and multiple radiation detector sensor ports disposed within the microwave chamber 110. Each microwave emitter port is paired with a radiation detector port configured to measure the microwave power emitted by the emitter port that has been transmitted through, i.e. not absorbed by, the food. In one implementation, an emitter port and its paired sensor port face each other, disposed on different sides of the food, such that in operation the sensor port measures the microwave power that is emitted by the paired emitter port that has not been absorbed by the intersecting food. The control circuit is configured to then approximately determine the optical depth of the food along the beam, or the axis formed by each pair of emitter and detector ports.

In one implementation, the control circuit 140 is configured to determine the extent to which the food is cooked for a specific food type, because optical depth (or loss tangent or dielectric characteristic) is a function of food type. In one implementation, the food type is assumed. For instance, in many applications microwave absorption is predominantly accounted for by the food's water content, or the food's optical depth is close enough to the optical depth of water so that the food type may be assumed to be water. In one implementation, food type is input to the control circuit 140 by an operator via a user interface (not shown) of the microwave oven 100.

For instance, in one implementation a user may select a food type (or food) from a selection menu of the user interface. Illustrative embodiments include a vegetable (such as broccoli), a salted meat (such as ham), a water and vegetable oil combination food (such as cake), and a non-salted meat (such as chuck roast). Vegetables are predominantly water so they may be treated as having an optical depth similar to water, salted meats contain sodium and chloride ions and may be treated as having a greater optical depth than non-ionized water, vegetable oil and water may have a distinct optical depth because vegetable oil absorbs microwave power due to the polar interaction of its molecules, and non-salted meat may have an optical depth similar to that of water.

In one implementation, the control circuit 140 is configured to estimate the food type by sensing the food optical depth at start-up based on a given food geometry and at an assumed temperature. In one implementation, control circuit 140 includes a library of food types and their optical depths at assumed temperatures for a given geometry, which is searched to determine the food type to be cooked. In one implementation, the control circuit 140 is configured to determine the extent to which food is cooked at a given moment based on the change in absorbed microwave power between start-up and the given moment where the start-up temperature is assumed.

In some implementations, the start-up temperature of the food is assumed to be a default temperature. In one implementation, the default start-up temperature is assumed to be an approximate lower range liquefaction temperature of water, e.g. 0° Celsius. In one implementation, the default start-up temperature is assumed to be an approximate refrigerated temperature, e.g. 6° Celsius. In one implementation, the default start-up temperature is assumed to be an approximate room temperature, e.g. 19° Celsius. In one implementation, start-up temperature is input to the control circuit 140 by an operator via the user interface (not shown) of the microwave oven 100. For instance, in one implementation a user may select a start-up temperature food type from a displayed selection menu of start-up temperature or start-up temperature categories. In another implementation, the user may select the start-up temperature via an input device of the user interface. In one implementation, the control circuit 140 is configured to estimate the starting temperature based upon sensing the food optical depth at start-up, based on a given food geometry and based upon an assumed (or user entered) food type.

Figure 2:
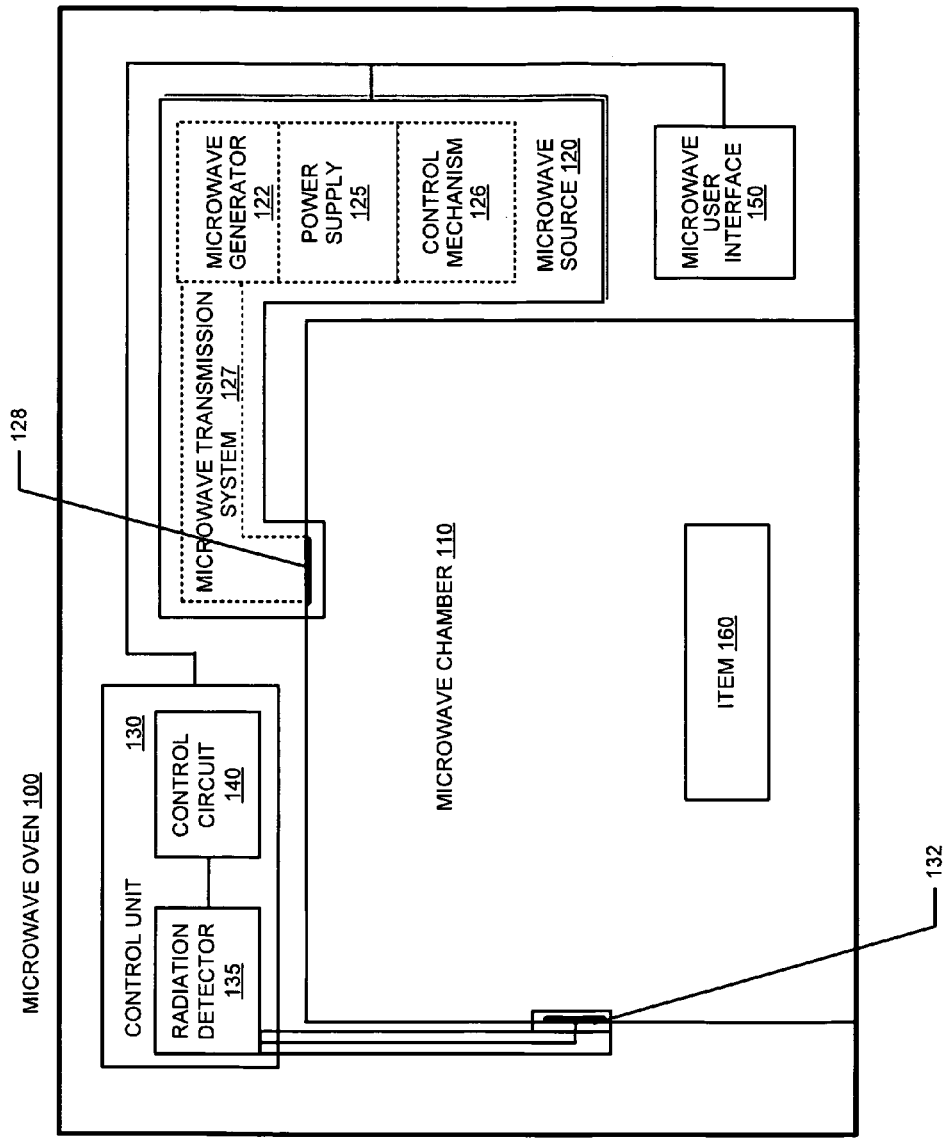
FIG. 2 is a front-view diagram of an embodiment of a microwave oven structure showing a chamber encompassing a food, a microwave source, a radiation detector, a microwave user interface, and a control circuit coupled to the microwave source, a control unit having a radiation detector and a control circuit, and a microwave user interface.

Turning now to FIG. 2, there is shown an illustrative front view embodiment of a microwave oven 100. The microwave oven 100 has a microwave chamber 110 for enclosing a food 160 to be cooked. The microwave oven 100 includes a microwave source 120 that has illustratively a microwave generator 122, an operationally coupled power supply 125, and an operationally coupled microwave transmission system 127, and at least one emitter port 128. The microwave source 120, via the microwave transmission system 127, is operationally coupled to the microwave chamber 110 through which the microwave power generated by the microwave generator 122 is emitted into the microwave chamber 110. The microwave source 120 has a radiation control mechanism 126 to control the microwave power emitted into the microwave chamber 110. In one illustrative implementation, the radiation control mechanism 126 is a unit that controls the power supplied by the power supply 125. In yet another illustrative implementation, the radiation control mechanism 126 is a radiation valve in the transmission system 127 that controls the power being emitted to the microwave chamber 110.

The microwave oven 100 includes a control unit 130 comprising a radiation detector 135 and a control circuit 140. The radiation detector 135 is operationally coupled to the microwave chamber 110. The radiation detector 135 detects the radiation power in the microwave chamber 110 that in this implementation is microwave power, the radiation detector 135 therefore being a microwave detector. The radiation detector 135 includes at least one detector port 132. Although depicted here as somewhat projecting from the wall of the microwave chamber 110, in one implementation the detector port 132 may be embedded within the wall. The microwave oven 100 includes a control circuit 140 that determines the extent to which the food 160 is cooked. The control circuit 140 is operationally coupled to the microwave source 120 and to the radiation detector 135. The control circuit 140 receives from the microwave source 120 a signal indicating the microwave power emitted to the microwave chamber 110. The control circuit 140 receives from the radiation detector 135 a signal indicating the microwave power in the microwave chamber 110. The control circuit 140 is configured to determine the microwave power absorbed by the food 160 based on the microwave power emitted to the microwave chamber 110 and the microwave power in the microwave chamber 110. The control circuit 140 is configured to then determine the extent to which the food is cooked based on the determined microwave power absorbed by the food 160 such as described herein (e.g., using the inferred optical depth, food type, and look-up table to determine a food temperature or extent to which food is cooked). In one implementation, the control circuit 140 provides to the microwave source 120 a signal indicating the microwave power the microwave source 120 should emit to the microwave chamber 110 to cook the food 160 based on the control circuit 140 determined microwave power absorbed by the food 160. The control circuit 140 is configured to generate this signal to the microwave source 120 based on the signal received from the microwave source 120 indicating the microwave power transmitted to the microwave chamber 110 and the signal from the radiation detector 135 indicating the microwave power in the microwave chamber 110, and any inputs from the microwave user interface 150. In one implementation, the control mechanism 126 receives from the control circuit 140 the signal indicating the microwave power the microwave source 120 should emit to the microwave chamber 110 and configures the microwave generator to emit microwave power as specified in the signal received from control circuit 140. In one implementation, the control circuit 140 determines that food cooking should cease and indicates that the microwave power should be zero. Although not shown in this figure, the microwave source 120 and/or the radiation detector 135 may include signal conditioning circuits for the signals provided to and/or received from the control circuit 140. The control circuit 140 is operationally coupled to the microwave user interface 150. The user interface is configured to receive user inputs from an operator to the control circuit 140, and enunciate any user messages from the control circuit 140 to the operator. As described above with respect to FIG. 1, the microwave user interface 150 is configured to receive from the operator, and provide to the control circuit 140, data regarding food type, initial food temperature, and even the extent of cooking desired, such as target food temperature. The microwave user interface 150 is embodied with typical operator input mechanisms, such as selection buttons, menus, and icon or character keying mechanisms.

Figure 3:
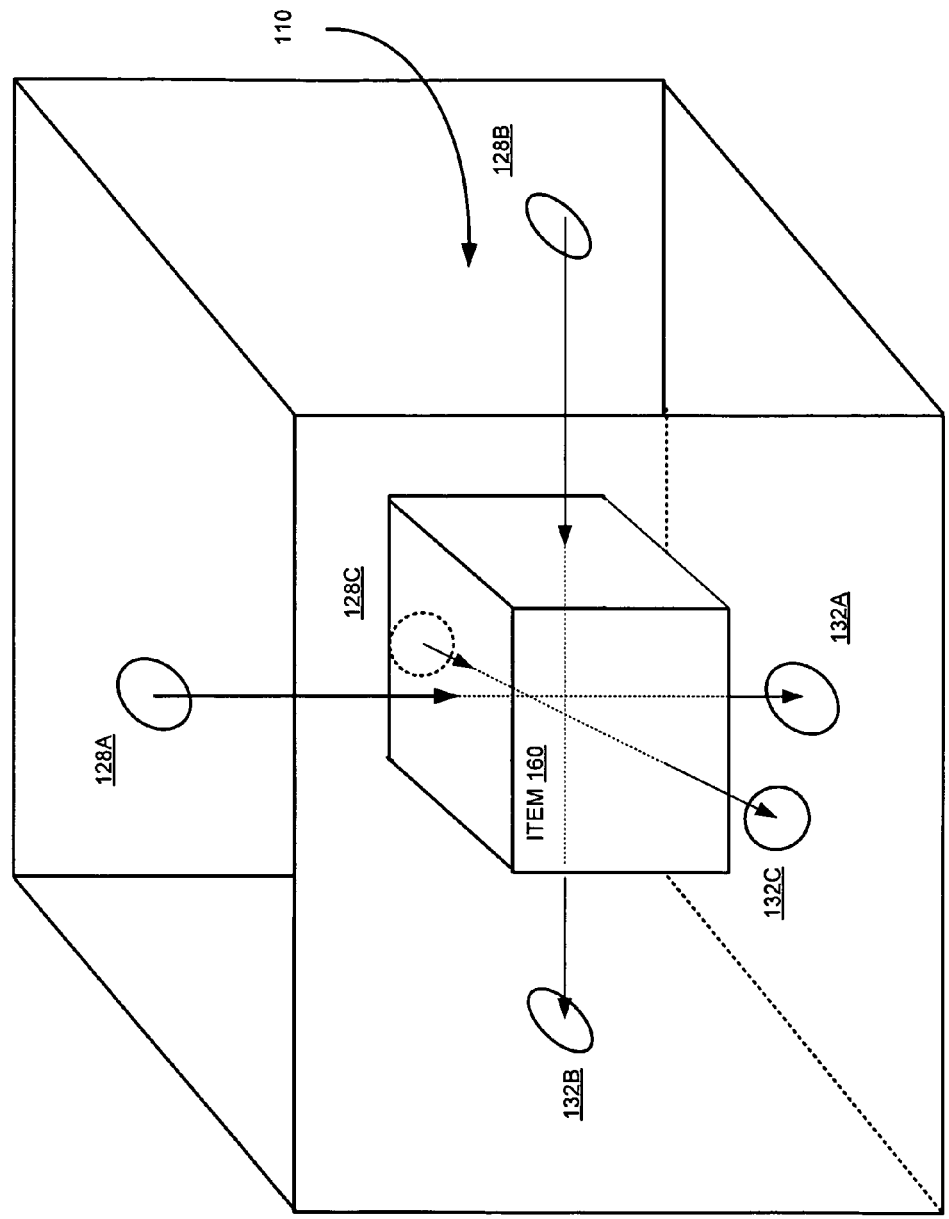
FIG. 3 is a front-view diagram of an embodiment of a microwave oven showing paired radiation emitters and detectors.

FIG. 3 portrays an illustrative embodiment of a microwave oven 100, having an emitter port 128A and a detector port 132A pair disposed within the microwave chamber 110. A paired emitter port and detector port are configured such that the emitter port beams radiation in the direction of its paired detector port, and the detector port can approximately measure that radiation. In operation, the form factor of microwave chamber 110 (and/or components therein) is such that food 160 is positioned between a paired emitter port and detector port so that the detector port can approximately measure the radiation that has not been absorbed by the food 160, but transmitted through/near the food 160. In one implementation, the microwave oven 100 has multiple emitter port and detector port pairs 128A-132A, 128B-132B, 128C-132C, each pair arranged so that the beam generated by an emitter port 128A, 128B, or 128C is orthogonal to each of the other beams. The beam intensities, measured relative to those taken with no load in the microwave chamber 110, give a basis for quantitatively estimating both the scattering and the absorption opacities of the food 160 along the axes of the aimed beams. Again, in one implementation, the radiation detector 135 (not shown) sends a signal indicating the radiation measured by the detector ports 132A 132B 132C to the control circuit 140 (not shown). The control circuit 140 determines the food optical depth along each beam to indicate how the food is cooking along each beam based on the absorbed radiation. By tomographic-like processing, data from a number of overlapping beams can be combined to indicate hot spots and/or cold spots along each beam. The control circuit 140 is configured to control the microwave power emission from each emitter port so that an emitter port generates power in response to the cooking of the food along its emitter beam.

In one implementation, the microwave oven 100 emits cooking microwave power into the microwave chamber 110 in addition to the radiation emitted by the emitters 128A, 128B, and/or 128C. In one implementation, the emitters 128A, 128B, and/or 128C are configured to emit radiation at a different frequency from the additional cooking microwave power, and the sensors 132A, 132B, and/or 132C are each configured to measure the frequency emitted by its paired emitter and not the cooking microwave frequency. In one implementation, the power emitted by the emitters 128A, 128B, and/or 128C is less than the cooking microwave power, accordingly the emitters are not configured to substantially cook the food, but instead to test the opacity of the food along its beam to determine how the food is cooking along the beam. In one implementation, the frequencies emitted by the emitter ports 128A, 128B, and/or 128C are not microwave frequencies and may not have a substantial temperature raising consequence in the food, but are instead frequencies selected to direct the beam and penetrate the food with a measured optical depth. In one implementation, the emitters are laser emitters, and the emitted beam is lased radiation.

Figure 4:
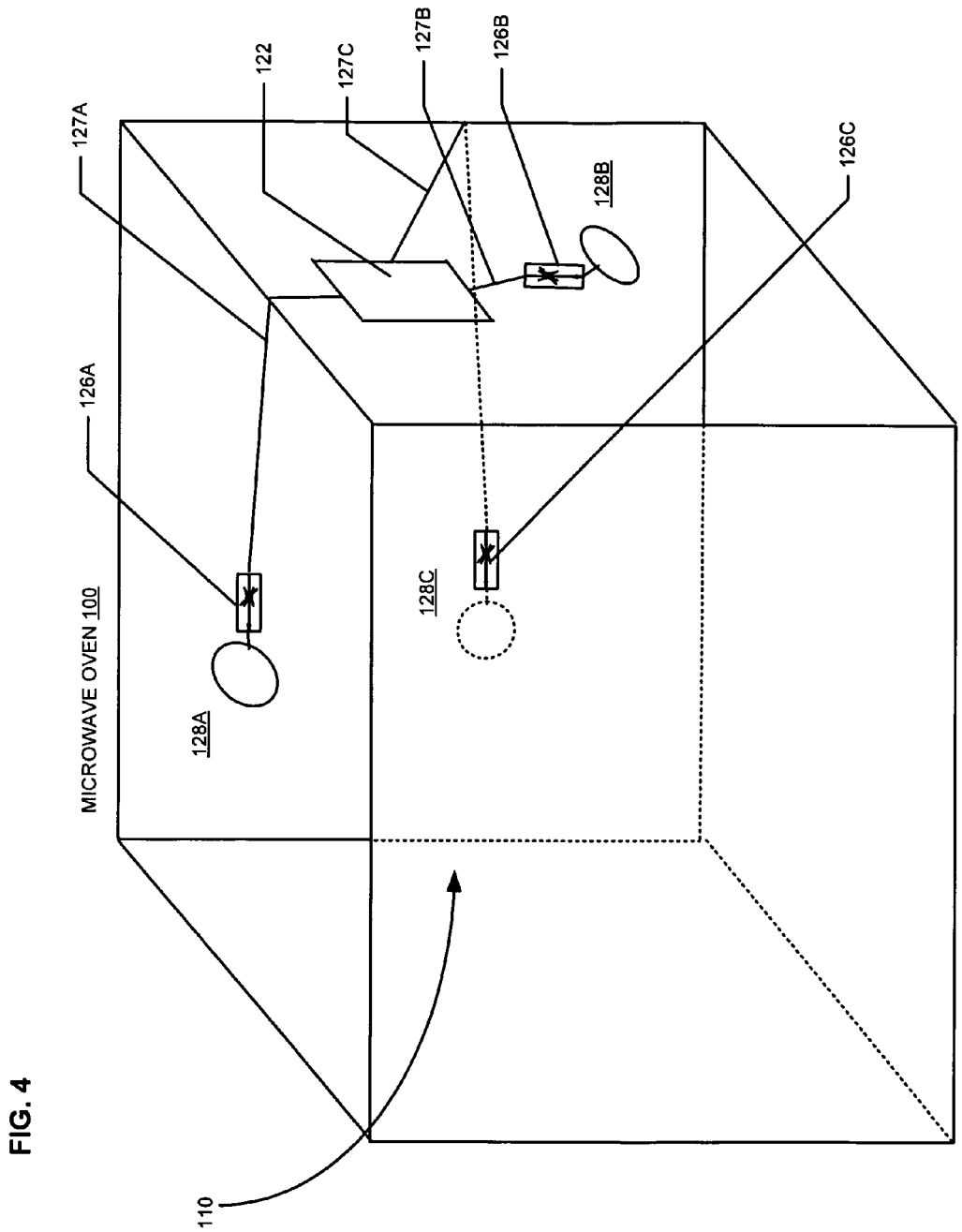
FIG. 4 is a front-view pictorial representation of an embodiment of a microwave oven showing a valved microwave transmission system coupled to each microwave emitter port.

Referring to FIG. 4, an illustrative embodiment of a microwave oven 100 shows illustrative emitter ports 128A 128B 128C coupled to the microwave generator 122 by a respective microwave transmission system 127A 127B 127C. Each microwave transmission system 127A 127B 127C has a respective coupled radiation control mechanism 126A 126B 126C, the radiation control mechanisms 126A 126B 126C configured illustratively as radiation valves in the transmission system 127, to control the power transmitted by each emitter port 128A 128B 128C. Illustratively, in one implementation the radiation control mechanism 126A, 126B, and/or 126C is a thin (aluminum) metal vane deployed transversely off the walls of the transmission system, and capable of moving variably within its respective transmission system. Each radiation control mechanism 126A 126B 126C moves under the control of the control circuit 140. These vane-motions in operation serve to vector the radiation power within the microwave transmission system 127, by partly opening or closing each duct of the microwave transmission system 127 to the passage of radiation in response to the control circuit 140. The time-varying motion of these vanes may in one implementation additionally steer beams along additional axes in the oven microwave chamber 110, so as to execute a cooking program for a particular food being cooked by the control circuit 140.

Figure 5:
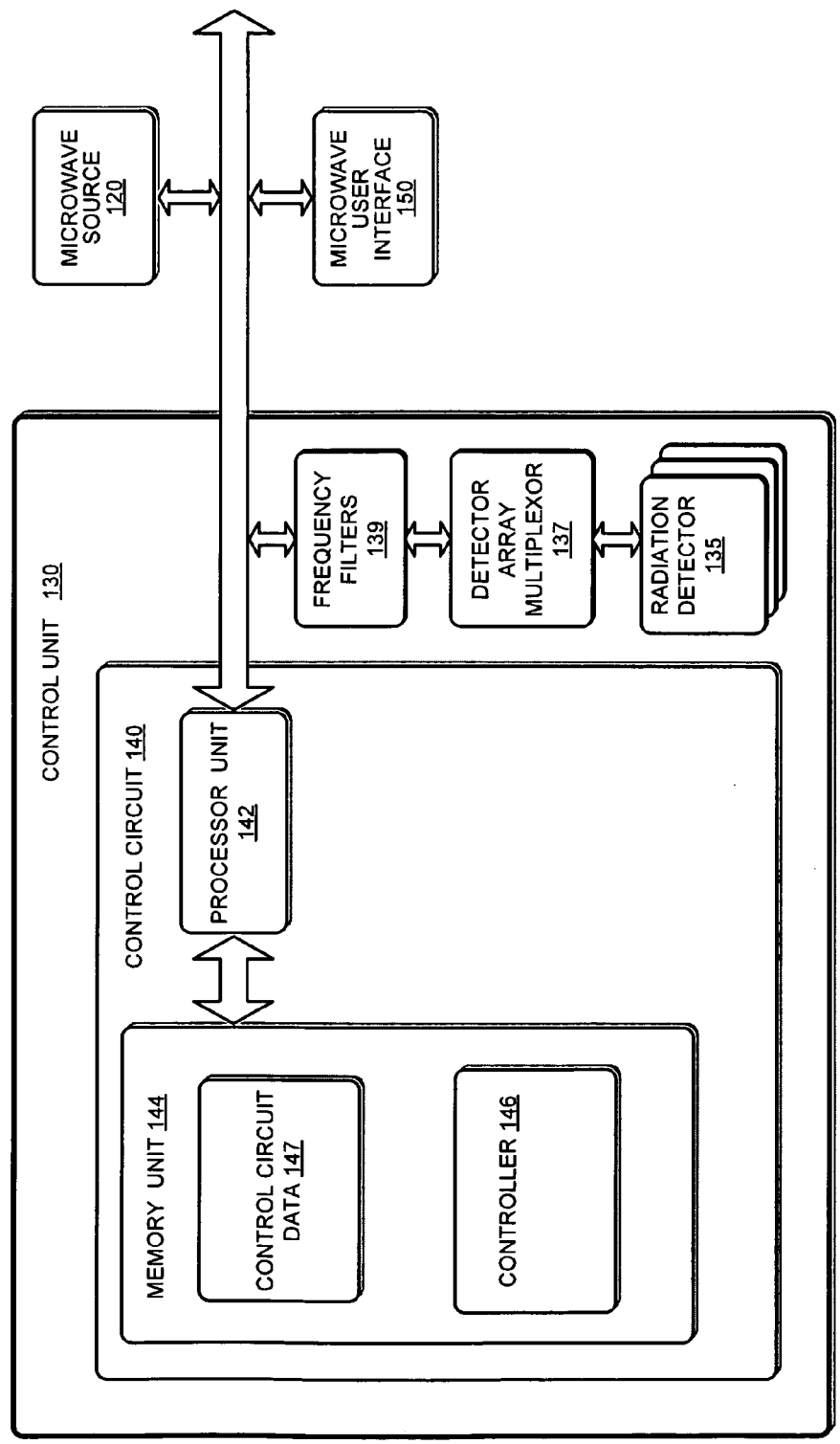
FIG. 5 is a block diagram of one embodiment of a microwave oven control unit.

FIG. 5 illustrates one implementation of an exemplary control circuit 140. The illustrative embodiment includes a processor unit 142 and a memory unit 144 that together form at least a part of a programmed computer. The programmed computer in operation performs logical operations for the microwave oven. Although a programmed computer is described herein, it is specifically contemplated that fixed circuitry could perform the operations herein described. For instance, each mathematical and logical operation described can be implemented by finite state circuits specifically dedicated to the operation described, including retrieving data, logically manipulating that data, and comparing that data to other data.

The processor unit 142 includes one or more processors each capable of executing program instructions on data. The memory unit 144 may include a non-volatile memory that stores the controller 146 and control circuit data 147. The controller 146, when in the form of processor-executable instructions, when executed by the processor unit 142 causes the processor to perform the acts described herein. The processing routines of the controller 146 and the fixed data stored on the non-volatile memory are sometimes termed firmware. Of course, even though the firmware is stored on the non-volatile memory, it may be executed from volatile memory after being written into the volatile memory. The non-volatile memory can be useful for storing the controller 146 and the control circuit data 147 when the memory unit is not powered. In operation of the microwave oven, at least a portion of the controller 146 and control circuit data 147 may be loaded into a volatile memory for execution from the volatile memory. At least some of the firmware may be stored in the non-volatile memory in a compressed form, then decompressed during an operation of the control circuit, and then stored in the volatile memory in its decompressed form for execution. In one implementation, at least some of the firmware may also be executed from the non-volatile memory. The firmware may include an initialization routine for initializing the control circuit 140 during a startup or reset of the control circuit 140. The processor unit 142 is operationally coupled to the radiation detector 135, the microwave source 120, and in an implementation having a microwave user interface, the microwave user interface 150. The processor unit 142 sends to and receives from the microwave source 120 and the microwave user interface 150 signals across the coupling between the control circuit 140 and the microwave source 120 and microwave user interface 150, that include the signals described herein.

In one implementation, the controller 146 causes the control circuit 140 to read a signal, the signal indicating the microwave power in the microwave chamber 110, from the radiation detector 135; and to read a signal, the signal indicating the microwave power emitted by the microwave source 120, from the microwave source 120. In one implementation, the control circuit 140 determines the value of the microwave power being absorbed by the food based on these signals, by subtracting from the value of the indicated microwave power emitted by the microwave source the value of the indicated microwave power in the microwave chamber 110. As required for each application, each signal is adjusted for the specific characteristics of the microwave oven 100, the shape of the microwave chamber, the location and characteristics of the radiation detector 135, and the characteristics of the microwave chamber that may illustratively enable food absorption of already transmitted microwaves, to develop a more accurate estimate of the microwave power absorbed by the food.

In one implementation, the controller 146 causes the control circuit 140 to determine the degree that the food has cooked, or the temperature of the food, based on the microwave power being absorbed by the food (e.g., as described elsewhere herein). In one implementation, this determination is based on a default food volume and food type. In one implementation, the food volume and/or the food type is input to the control circuit 140 by an operator through the microwave user interface 150. In one implementation, a prior reading of the power absorbed by the food, such as at start-up, is measured, a default temperature or alternatively an operator input food temperature is acquired, and the food type is estimated based upon the food volume, the initial temperature, and the power being absorbed.

In one implementation, the controller 146 causes the control circuit 140 to read each of the separate radiation detection signals from multiple detection ports 132 indicating the microwave power transmitted through the food along a beam, and to read each of the signals from the microwave source 120 indicating the power emitted from each of the emitter ports 128. In one implementation, instead of an indication of the power emitted by each of the emitter ports coming from the microwave source 120, the power emitted from each of the emitter ports is determined by the control circuit 140 based upon the control circuit generated signal indicating the power to be emitted by the emitter ports. The control circuit 140 determines the optical depth or estimated food temperature along the beam, by subtracting the value of the indicated microwave power detected by a detector port from the power emitted by its paired emitter port. As required for each application, each signal is adjusted for the specific characteristics of the microwave oven 100, such as the efficiency and characteristics of emission along the beam, and the accuracy of the paired detector in sensing a beam.

In one implementation, the controller 146 causes the control circuit 140 to send a signal to the microwave source 120 to control the power of the microwave radiation radiated from the emitter ports, based on the determined microwave power absorbed by the food, the determined temperature of the food, or the determined optical depth or estimated temperature of the food along each beam of a paired emitter-detector port system. In one implementation, the signal indicates whether or not power should be emitted into the microwave chamber 110 or by an emitter port. In one implementation, the signal instead indicates the amount of power that should be emitted into the microwave chamber or emitter port. In one implementation, the indication of the signal is based on a target temperature of the food, derived from a database or according to a functional relationship. In one implementation, the indication of the signal is according to a recipe based on both time and optical depth (or temperature), including in one implementation a separate recipe for each region of the food (such as the inside or the edges), such that the signal is varied according to the recipe, including a separately varied signal for each emitter port.

In one implementation, the controller 146 causes the control circuit 140 to display on the microwave user interface 150 the temperature of the food, and/or a display of a temperature map of the food based on the food opacity (or temperature) sensed by each of the detector ports. In one implementation, the controller 146 causes the control circuit 140 to determine the cooking time remaining based on a recipe, food type, and current optical depth (or temperature), and displays the time on the microwave user interface 150.

Figure 6:
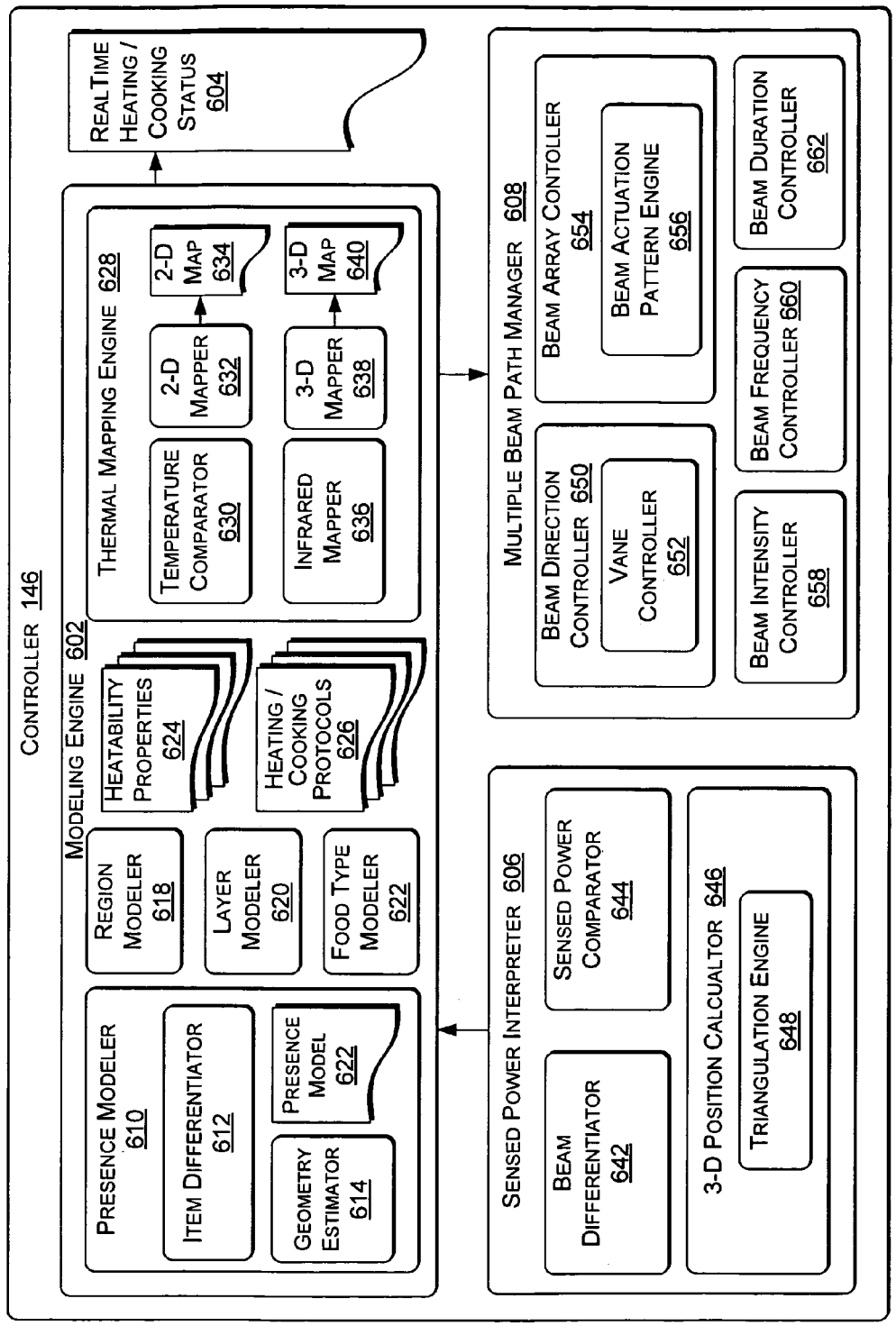
FIG. 6 is a block diagram of the exemplary controller of FIG. 5, in greater detail.

Referring now to FIG. 6, an exemplary controller 146, introduced above in FIG. 5, is now shown in greater detail. The illustrated configuration of the exemplary controller 146 is only one example for the sake of description. Other configurations of the controller 146 using the same or different components are also possible within the scope of the subject matter. The illustrated exemplary controller 146 may be implemented in hardware; combinations of hardware, software, firmware, etc.

A list of example components of the illustrated controller 146 is now provided before describing operation of the controller 146. The illustrated implementation of the controller 146 includes a modeling engine 602 that can provide a real time heating and cooking status 604. The modeling engine 602 is also operationally coupled with a sensed power interpreter 606 and a multiple beam path manager 608 to be described below.

The illustrated modeling engine 602 further includes a presence modeler 610 that may include an item differentiator 612, a geometry estimator 614, and a presence model 616. The modeling engine 602 may further include a region modeler 618, a layer modeler 620, a food type modeler 622; a database, buffer, or working list of heatability properties 624; heating/cooking protocols 626; and a thermal mapping engine 628, which may include a temperature comparator 630, a 2-dimensional mapper 632 for creating a 2-D temperature map 634; an infrared mapper 636, and a 3-dimensional mapper 638 for creating a 3-D temperature map 640.

The sensed power interpreter 606 may further include a beam differentiator 642, a sensed power comparator 644, and a 3-D position calculator 646 that may include a triangulation engine 648.

The multiple beam path manager 608 may further include a beam direction controller 650 that may include a vane controller 652; a beam array controller 654 that may include a beam actuation pattern engine 656; a beam intensity controller 658, a beam frequency controller 660, and a beam duration controller 662.

Operation of the Exemplary Controller

Among other functions, the controller 146 dynamically manages the microwave power emitted by the microwave source 120 to the microwave chamber 110, e.g., as based on a signal from the modeling engine 602. The modeling engine 602 tracks a relationship between the sensed level of the microwave power in the microwave chamber 110 and a heatability property 624 of an item 160 in the microwave chamber 110. In one implementation, the modeling engine 602 is separate from the controller 146, but in the illustrated implementation of the controller 146, the modeling engine 602 is included in the controller 146.

The multiple beam path manager 608 signals the microwave source 120 to transfer the microwave power to the microwave chamber 110 via multiple beam paths, wherein each beam path has an origin on one side of the item 160 and a termination on an opposing side of the item 160 (e.g., in FIG. 3, the beam path from emitter 128A to radiation detector 132A). One or more microwave sensors associated with the radiation detector 135 measure at least part of the microwave power on a termination side of each beam path.

Figure 7:
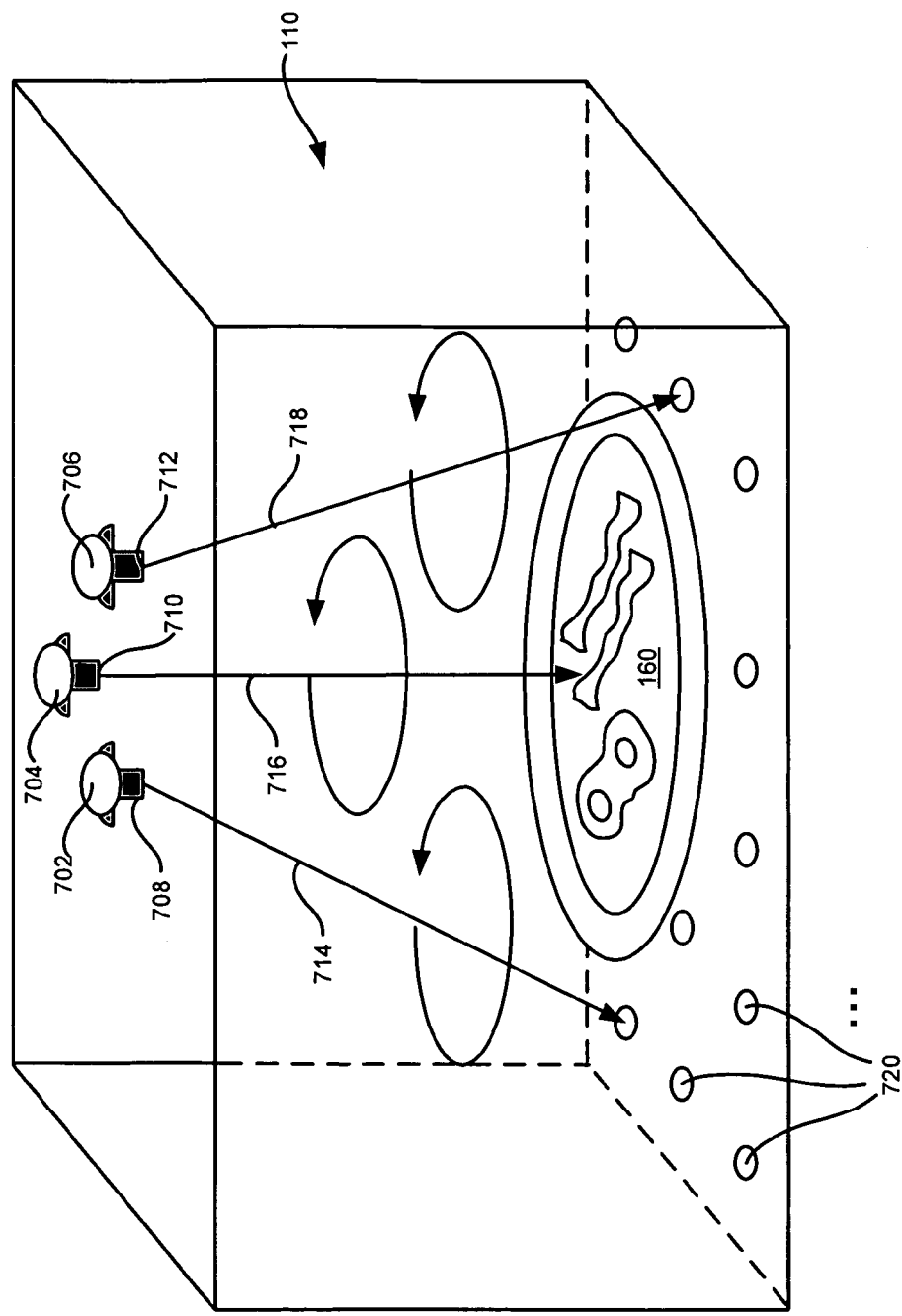
FIG. 7 is a diagram of an exemplary microwave chamber including a microwave source for emitting directable microwave beam paths.

In FIG. 6, the multiple beam path manager 608 may further include the beam direction controller 650 for directing at least one of the beam paths between multiple locations in the microwave chamber. The beam direction controller 650 may further include the vane controller 652 for changing a position of a metallic vane to reflect microwaves from the microwave source, i.e., from a first location in the microwave chamber 110 to a second location in the microwave chamber 110. FIG. 7 shows a microwave source 120 consisting of emitters 702, 704, and 706. Each emitter 702, 704, 706 has an associated vane 708, 710, 712, respectively, for directing the microwave power output into a directable beam path, such as beam paths 714, 716, and 718. Thus, when the beam direction controller 650 is used to change the direction vector of a beam path, the individual microwave sensors 720 associated with the radiation detector 135 may not necessarily be paired with the microwave emitters 702, 704, 706 in a one-to-one relationship.

Returning to FIG. 6, the multiple beam path manager 608 may also include the beam array controller 654 for switching from a first emitter in an array of microwave emitters to a second emitter in the array of microwave emitters in order to accomplish directing a beam path from a first location in the microwave chamber 110 to a second location in the microwave chamber 110. That is, the beam array controller 654 can focus a microwave beam on a given location in the microwave chamber 110 by turning fixed emitter elements of an emitter array on or off.

The beam actuation pattern engine 656 allows the multiple beam path manager 608 to designate one or more emitter elements from such an array of microwave emitters for actuation either all at once or in a sequence, to create a static or sequential pattern of beam paths in the microwave chamber.

Figure 8:
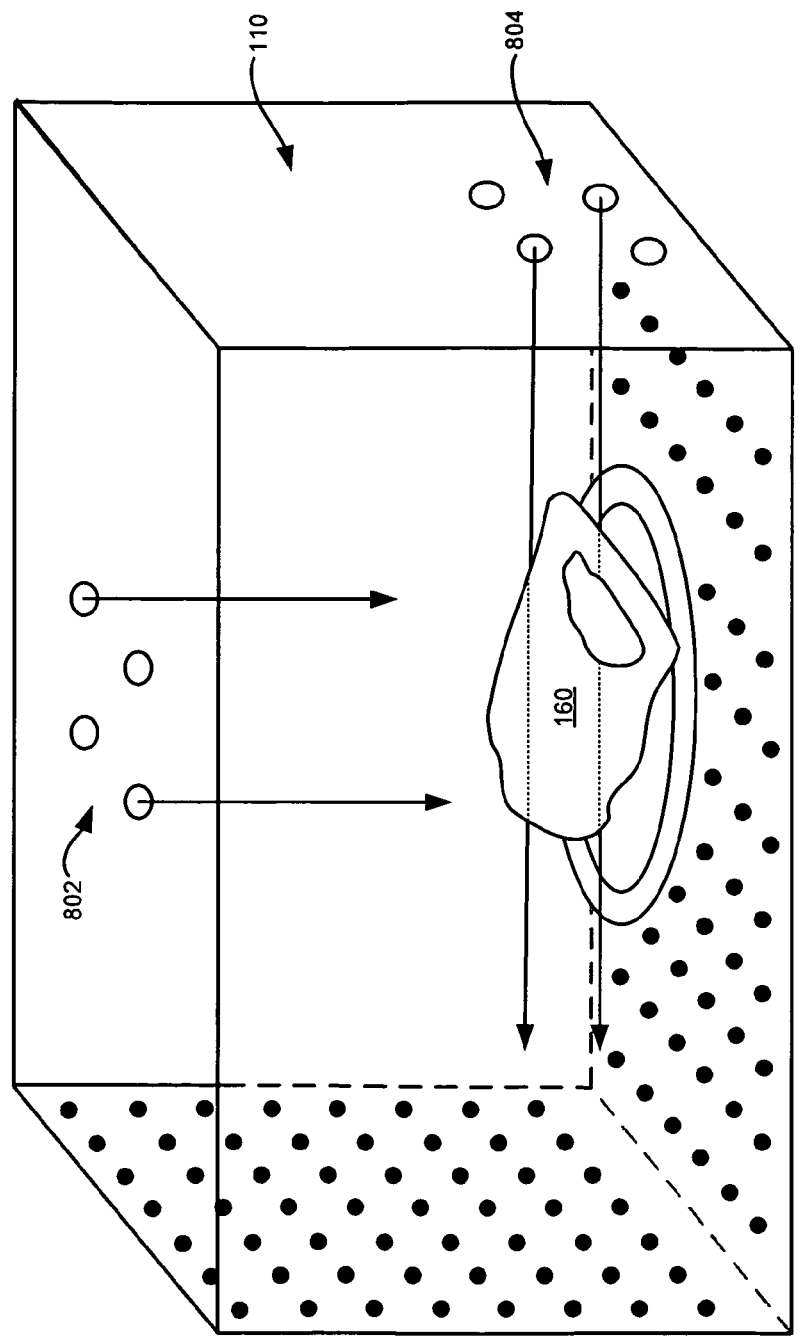
FIG. 8 is a diagram of an exemplary microwave chamber including microwave emitter arrays with switchable emitter elements that transfer microwave power along fixed beam paths.

FIG. 8 shows an example microwave chamber 110 that has microwave emitter arrays 802 and 804 on different sides of the microwave chamber 110. In the illustrated example configuration, the microwave emitter arrays 802 and 804 have emitter elements that transfer microwave power to the microwave chamber 110 in beam paths that each have a fixed direction. The beam array controller 654 can move a microwave beam path to many locations in the microwave chamber 110 by turning emitter elements of the microwave emitter arrays 802 and 804 on or off. Microwave sensor arrays 806 and 808 are typically disposed on opposing sides of the microwave chamber 110 from the microwave emitter arrays 802, 804. The illustrated arrangement may use emitter-sensor pairs, in which each emitter is paired with one or more sensors in a fixed relationship, but this is not a requirement.

Returning to FIG. 6, the multiple beam path manager 608 may also include a beam intensity controller 658 for controlling an intensity of microwave electromagnetic radiation associated with a beam path; a beam frequency controller 660 for controlling a frequency of microwave electromagnetic radiation associated with a beam path; and a beam duration controller 662. These components control the attributes of each microwave beam produced by a discrete microwave emitter or can separately control the microwave power output of each emitter element in an array of microwave emitter arrays 802, 804.

The beam frequency controller 660 can control and/or assign a microwave frequency to each emitter that emits the microwave power for a beam path, that is, the assigned frequency is trackable by the microwave sensor elements of the radiation detector 135. In one implementation, one or more radiation detectors 135 for sensing a level of microwave power in a microwave chamber 110 are capable of measuring the microwave frequency of each beam path at multiple locations in the microwave chamber 110. In other words, microwave sensors may be used that can sense multiple frequencies of microwave energy and return a signal that indicates the detected frequency, or microwave sensors that only sense one frequency can be used, but a given array of microwave sensors, such as sensor arrays 806 and 808 (in FIG. 8) may include a selection of different types of sensors that as a group can return a signal indicating a detected frequency.

Figure 9:
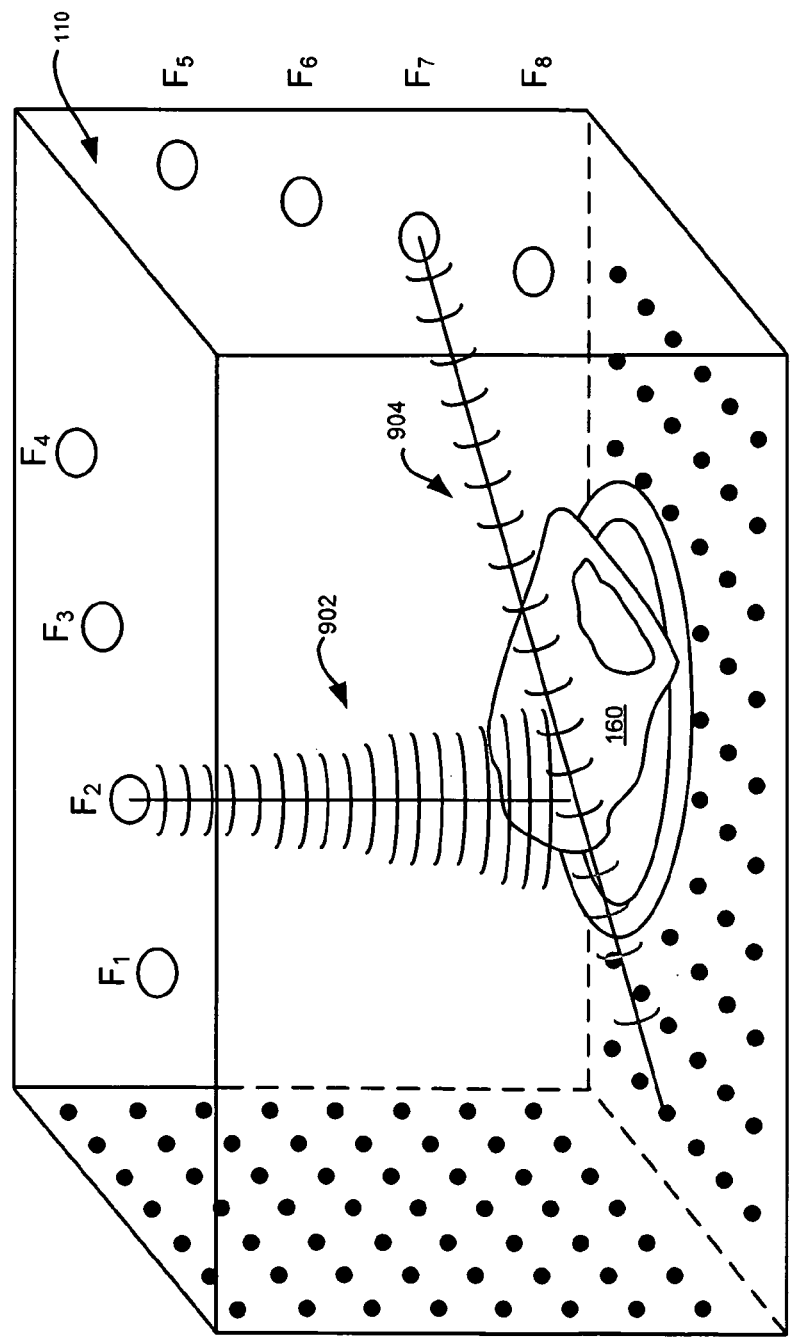
FIG. 9 is a diagram of an exemplary microwave chamber including microwave emitters that emit microwave beam paths of different frequencies.

As shown in FIG. 9, the beam direction controller 650 may include control logic for directing the microwave source 120 to heat a first layer or first region of the item 160 via a microwave beam that possesses a first microwave frequency 902 and to heat a second layer or second region of the item 160 via a microwave beam that possesses a second microwave frequency 904.

Alternatively, the multiple beam path manager 608 may focus the microwave beam that possesses the first microwave frequency 902 and the microwave beam that possesses the second microwave frequency 904 on the same region or point, to more precisely control the microwave energy being transferred to a particular location in the item 160. The use of two or more microwave frequencies 902 and 904 may allow the sensed power interpreter 606 to track the effectiveness of adding beams together or reinforcing one microwave beam with another, since the effects of each beam can be tracked at the respectively assigned frequencies. The control unit 130 may include the frequency filters 139, as in FIG. 5, to differentiate different microwave beams operating at respective frequencies from the conglomerated sensory input of multiple microwave sensors.

Returning to FIG. 6, the beam duration controller 662 typically acts in conjunction with the beam intensity controller 658 to fine-tune the microwave energy being beamed at a particular region of the item 160. When there are multiple items 160 in the microwave chamber 110, the beam duration controller can also be leveraged by the modeling engine 602 to synchronize the finish time of the cooking or heating so that different items achieve a concerted finish. For example, the different items 160 may finish cooking at the same time before a meal starts.

The sensed power interpreter 606 may receive signals from one or more radiation detectors 135 in order to sense a "per beam" level of microwave power in the microwave chamber 110. Thus, the beam differentiator 642 distinguishes a first microwave beam from a second microwave beam. The sensed power comparator 644 can distinguish a first power level of a first microwave beam from a second power level of a second microwave beam.

Figure 10:
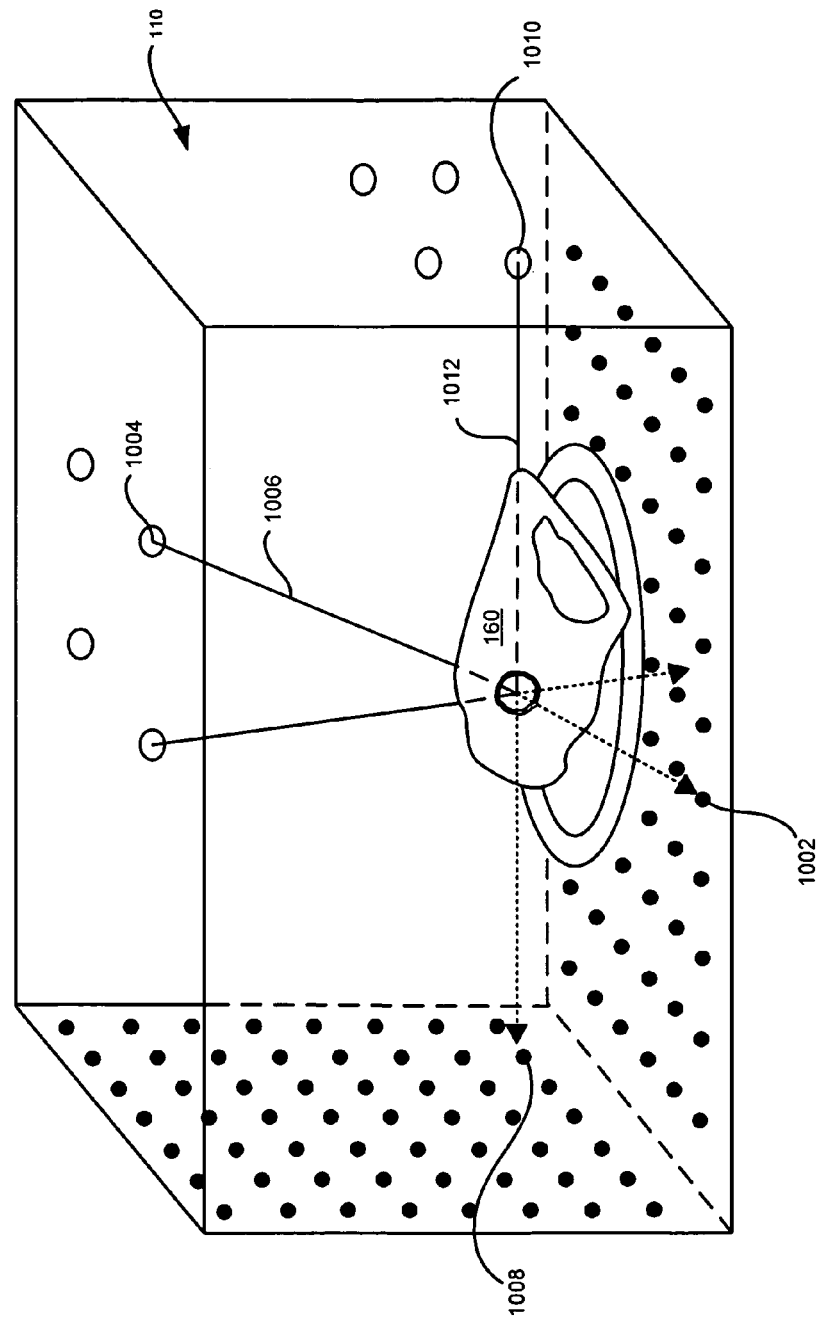
FIG. 10 is a diagram of an exemplary microwave chamber including microwave emitters and microwave sensors that can be used to determine a 3-D position within the microwave chamber.

As shown in FIG. 10, the 3-D position calculator 646 can determine a location in the 3-dimensional space of the microwave chamber 110 based on an intersection of first and second (or more) microwave beam paths. For example, a first microwave sensor 1002 is paired or may become paired with a first microwave emitter 1004 associated with the first microwave beam path 1006 and a second microwave sensor 1008 is paired with a second microwave emitter 1010 associated with the second microwave beam path 1012. When the sensor and emitter are paired along beam paths that are at fixed right angles to the sides of the microwave chamber, the determination of a 3-D position (typically within the item 160) is a relatively simple calculation of where an x-axis of a horizontal beam intersects a y-axis of a vertical beam.

In FIG. 6, the 3-D position calculator 646 may also include the a triangulation engine 648 for determining a location in the 3-dimensional space of the microwave chamber 110 based on a first beam direction of a first microwave beam associated with a first microwave emitter and a second beam direction of a second microwave beam associated with a second microwave emitter. That is, when a sensor detects a microwave beam the multiple beam path manager 608 may know which emitter is originating the beam, even though the incidence angle of the beam on the sensor may not be at right angles. The triangulation engine 648 can determine a location in the 3-dimensional space of the microwave chamber 110 of beam intersection when there is enough information to determine an angle of beam incidence at each of two or more sensors. Of course, the multiple beam path manager 608, via the beam direction controller 650, may already know where two or more microwave beams are directed with the intention of coinciding at a particular point or region. However, the 3-D position calculator 646 may be able to calculate hot spots or cold spots in the item 160 being heated based on received microwave power at the sensors, which provides information that the beam direction controller 650 does not initially have. Thus, the sensed power interpreter 606 may include logic for calculating a location of an interior isothermal region of the item, wherein the interior isothermal region varies in temperature beyond a threshold from an adjacent region.

Likewise, the beam direction controller 650 may include control logic to direct a microwave beam path to an interior isothermal region that has a temperature lower than an adjacent region to heat the isothermal region, or to direct a microwave beam path to an interior isothermal region that has a temperature higher than an adjacent region to cool the isothermal region.

The controller 146 may direct the microwave source 120 to emit a burst or short interval of microwave power at the item 160 and then turn off the microwave power to be able to detect spontaneous microwave emissions from the item 160, i.e., in order to obtain an initial topography or a 3-D map 640 of temperatures or electrodynamic properties of the item 160. Thus, the controller 146 may include logic for emitting a first measure of the microwave power to the microwave chamber 110 for a first interval; control logic for turning off the emitting; and control logic for sensing a second measure of the microwave power as an emission of radiation from the item, wherein the microwave power absorbed by the item 160 spontaneously radiates from the item 160.

The thermal mapping engine 628 maps one or more isothermal regions of the item 160 based on a sensed measure of the microwave power in the microwave chamber 110. The 3-D mapper 638 can map isothermal regions in the interior of the item into a 3-D temperature map 640 based on the sensing from different sensor arrays disposed on at least two different sides of the item.

In one implementation, the thermal mapping engine 628 includes an infrared mapper 636 for obtaining an infrared image (via an infrared emitter and sensor in the microwave chamber 110) of one or more surfaces of the item and thus determines isothermal areas on one or more surfaces of the item 160. The 3-D mapper 638 may map 3-dimensional isothermal regions in the interior of the item based on the sensing from different sensor arrays that are disposed on at least two different sides of the item 160. The 3-D mapper 638 can then associate the isothermal regions in the interior of the item with the isothermal areas on the one or more surfaces of the item as determined by the infrared mapper 636. Typically an infrared map of the surface of the item 160 has a higher resolution than the microwave maps 634, 640 of the interior of the item 160. The infrared map can be correlated with the microwave maps 634, 640 to improve the resolution and dependability of the microwave maps 634, 640.

The modeling engine 602 can consult the heating/cooking protocols 626 for evaluating one of the temperature maps 634, 640 provided by the thermal mapping engine 628 in order to provide a real time heating and cooking status 604 of the item 160.

Figure 11:
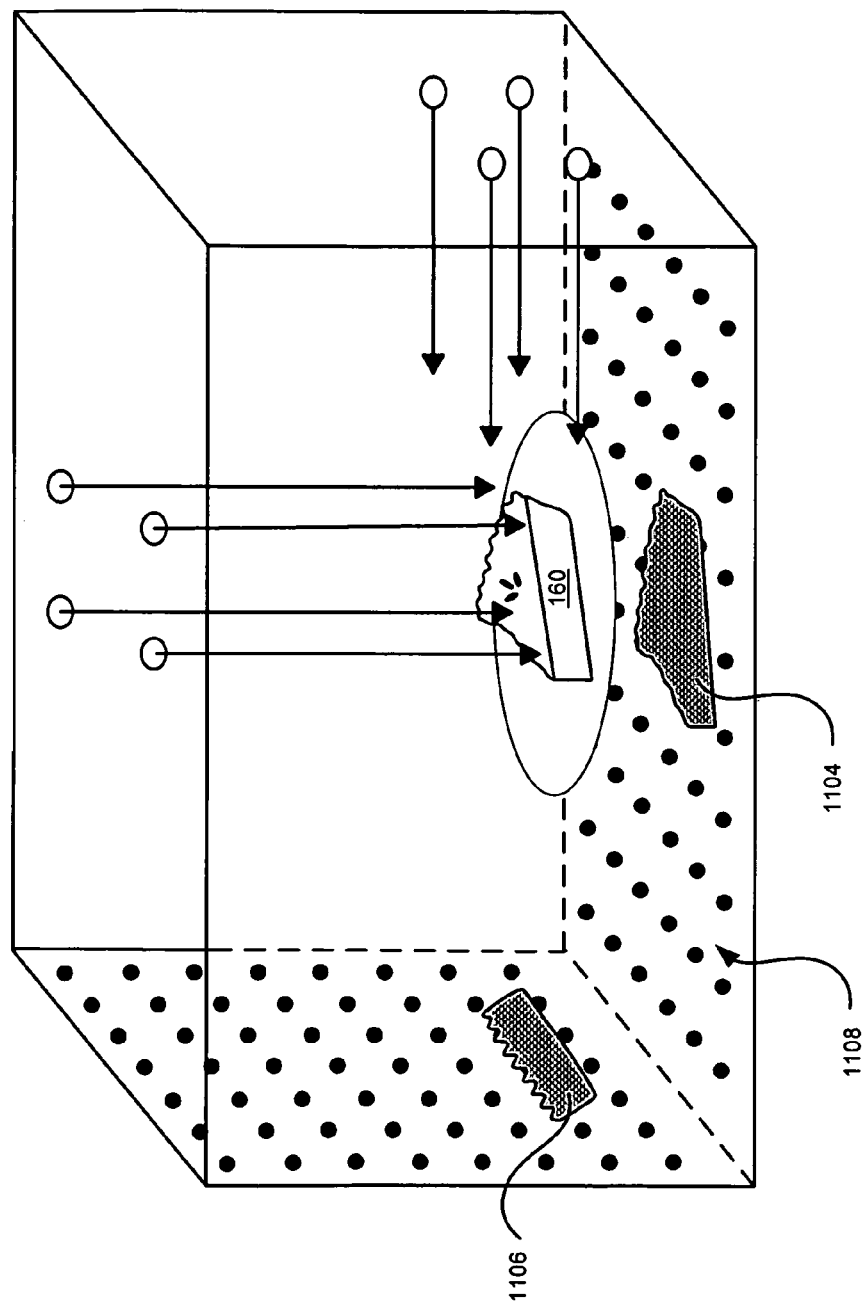
FIG. 11 is a diagram of an exemplary microwave chamber including microwave emitters and microwave sensors that can be used to determine a presence of an item to be heated in the microwave chamber.

The presence modeler 610 can determine a presence of the item 160 in the microwave chamber, i.e., can sense whether the item 160 is present or not. In one implementation, the presence modeler includes control logic for signaling the beam array controller 654 to scan the microwave chamber 110 for a presence of the item 160. The presence modeler 610 detects an attenuation of the microwave power associated with each beam path that is intersected by the item 160, indicating a presence of the item. FIG. 11 shows an example microwave chamber 110 in which the presence modeler 610 signals the beam array controller 654 or the beam direction controller 650 to scan the microwave chamber. Some of the microwave beam paths are blocked or partially blocked by the item 160, causing microwave sensors behind "shadows" 1104 and 1106 of the item 160 to measure a lower microwave power than sensors that are not blocked by the item 160. If emitters scan the item 160 from at least two dimensions, then the shadows of the item 160 can be integrated to estimate a relative 3-D position of the item 160 in the microwave chamber 110, and to estimate a size and geometry (shape) of the item 160.

A presence model 616 may include spacing threshold parameters selected relative to the spacing of sensors in a given microwave sensor array 1108 for allowing the item differentiator 612 to distinguish multiple items 160 from each other in the microwave chamber 110, including their respective 3-dimensional sizes and shapes, as estimated by the geometry estimator 614.

The modeling engine 602 may include a region modeler 618 for modeling a value of a heatability property in different regions of the same item. Thus, the region modeler 618 may include control logic for signaling the multiple beam path manager 608 to apply a different measure of the microwave power to each of the different regions according to a real-time current value of the heatability property 624 in each individual region.

The region modeler 618 may also include control logic for dynamically managing a measure of the microwave power applied to each different region based upon ongoing variations in a different heatability property associated with each region.

The food type modeler 622 can harmonize multiple heatability properties 624 to determine a food type of the item 160. In one implementation, the food type modeler 622 is assisted by a table or database that relates the heatability properties 624 to likely food types. Thus, in one implementation, the food type modeler 622 relates an optical depth of the item 160, a geometry estimation signal from the geometry estimator 614, and a likely temperature of the item 160 to obtain a food type classification of the item 160 using a look-up table. In one implementation, the food type modeler 622 may use an iterative approach to also refine an estimate of the current temperature of the item 160 from the sensed optical depth.

The modeling engine 602 includes modeling logic for relating the sensed level of the microwave power to one or more heatability properties of the item 160. An example list of heatability properties 624 that may be utilized by the modeling engine 602 includes, but is not limited to the following properties: a microwave absorptivity of the item 160, an optical depth of the item 160, a temperature of the item 160, a dielectric property of the item 160, a physical state of a carbohydrate, a protein, or a fat in the item 160, a liquid food state of the item 160, a moisture content of the item 160, a physical geometry of the item, and a food type of the item 160.

In one implementation, the modeling engine 602 selects the type of modeling to apply and/or the heatability property to model for a given region of the item 160 based on a sensed level of the microwave power associated with the given region or based on some other characteristic of the sensed microwave power in the microwave chamber 110.

Exemplary Methods

Figure 12:
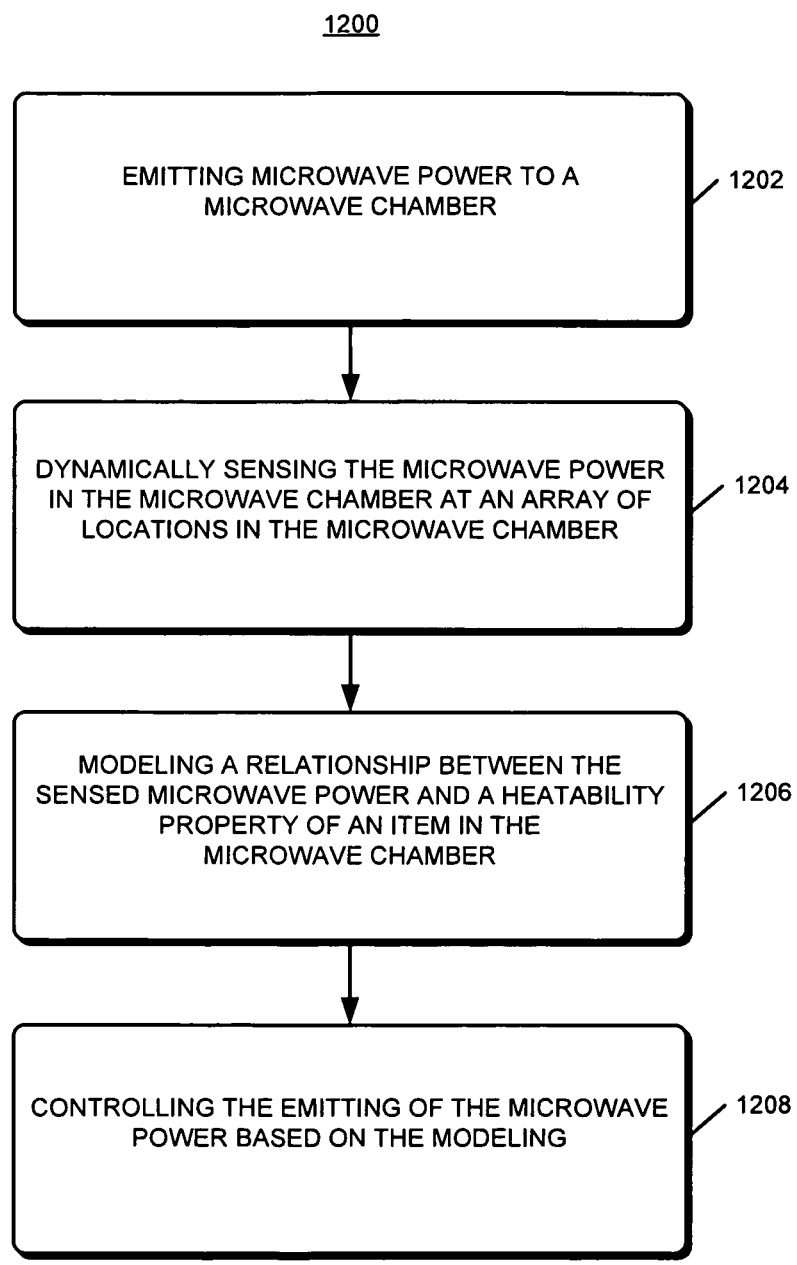
FIG. 12 is a flow diagram of an exemplary method of dynamically sensing, modeling, and controlling a microwave heating device.

FIG. 12 shows an exemplary method 1200 of dynamically sensing, modeling, and controlling a microwave heating device. In the flow diagram, the operations are summarized in individual blocks. Depending on implementation, the exemplary method 1200 may be performed by hardware, or combinations of hardware, software, firmware, etc., for example, by components of the exemplary control unit 130.

At block 1202, microwave power is emitted to a microwave chamber. A microwave source that includes an array of magnetron emitters may be used to emit the microwave power.

At block 1204, the microwave power is dynamically sensed in the microwave chamber at an array of locations. An array of detector diodes that is governed by a controller can be dynamically managed to optimally sense characteristics of microwave power in the microwave chamber that can be modeled to optimize heating of a particular item.

At block 1206, a relationship between the sensed microwave power and a heatability property of an item in the microwave chamber is modeled. For example, the modeling engine 602 can model a select heatability property that is measurable via the sensed microwave power.

At block 1208, the emitting of the microwave power is controlled based on the modeling. In one implementation, a multiple beam path manager 608 controls the application of microwave power to an item being heat based on signals from the modeling engine 602.

Figure 13:
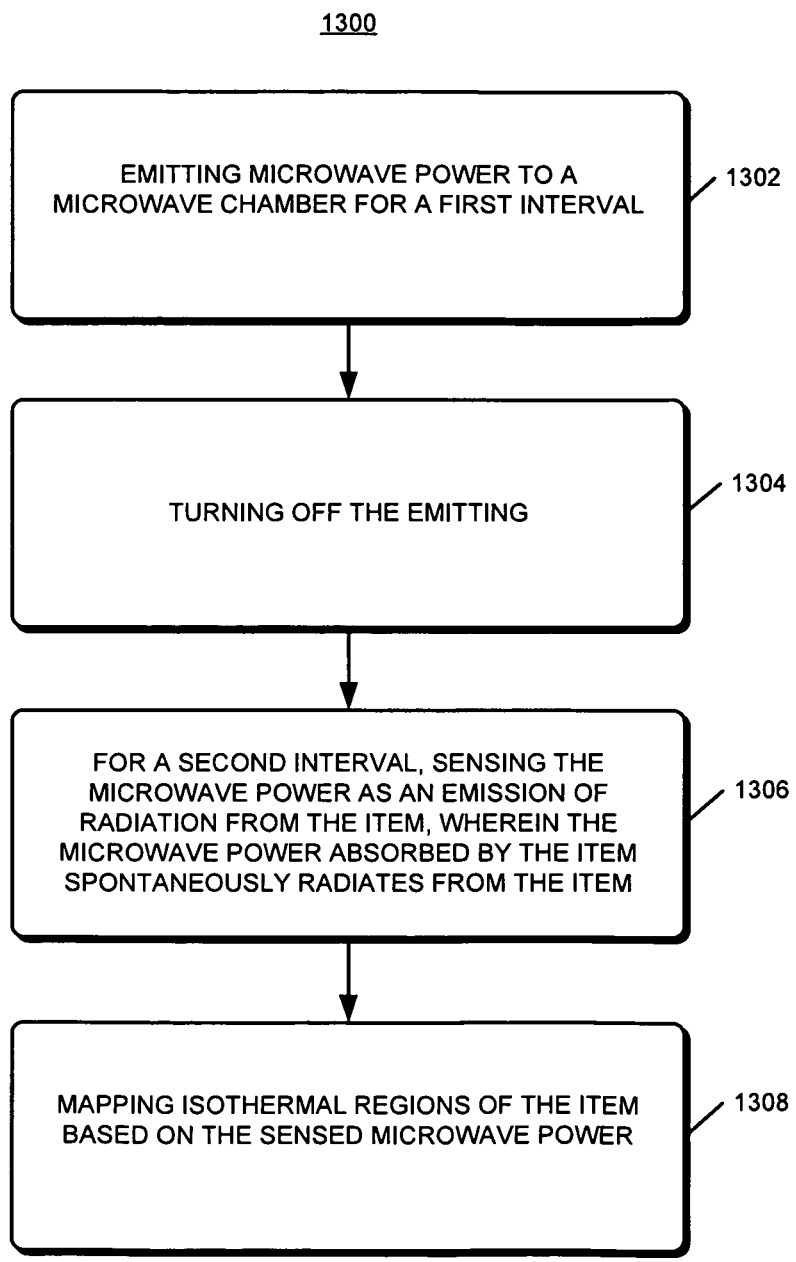
FIG. 13 is a flow diagram of an exemplary method of sensing microwave power from spontaneously radiating emissions from an item in a microwave chamber.

FIG. 13 is a flow diagram of an exemplary method 1300 of sensing microwave emissions spontaneously radiating from an item in a microwave chamber. In the flow diagram, the operations are summarized in individual blocks. Depending on implementation, the exemplary method 1300 may be performed by hardware, or combinations of hardware, software, firmware, etc., for example, by components of the exemplary control unit 130.

At block 1302, microwave power is emitted to a microwave chamber over a first interval. The controller 146 can apply a brief burst or flash of microwave power to activate microwave absorption in the item being heated.

At block 1304, the emitting is turned off, e.g., by the beam actuation pattern engine 656.

At block 1306, for a second interval, the microwave power is sensed as an emission from the item, wherein the microwave power absorbed by the item spontaneously radiates from the item. A radiation evaluator, such as the sensed power interpreter 606 and the modeling engine 602 can map a thermal reaction of the item being heated to the brief application of the microwave power.

At block 1308, isothermal regions of the item are mapped, based on the sensed microwave power. For example, the modeling engine 602 may include a thermal mapping engine 628 to show thermal regions of the item being heated.

Figure 14:
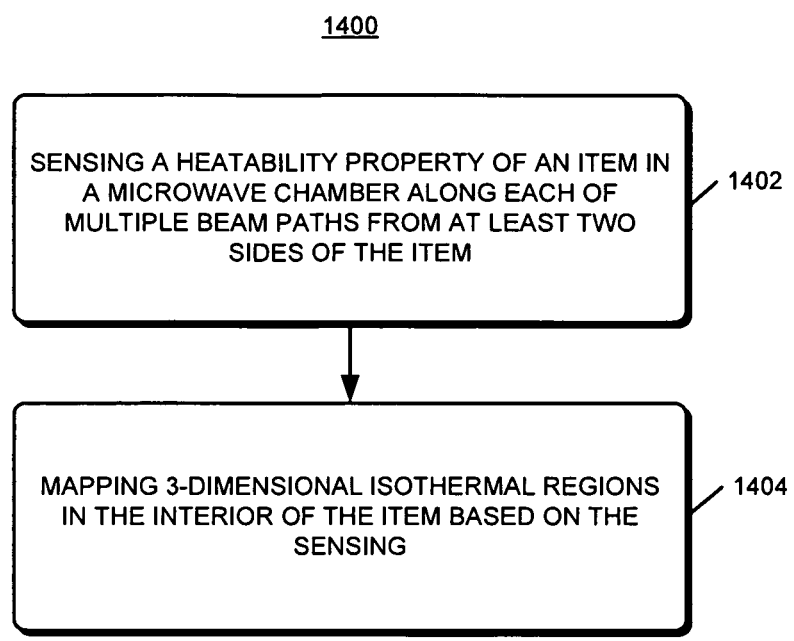
FIG. 14 is a flow diagram of an exemplary method of sensing a heatability property of an item in a microwave chamber and creating a 3-dimensional temperature map of the item.

FIG. 14 is a flow diagram of an exemplary method 1400 of sensing a heatability property of an item in a microwave chamber and creating a 3-dimensional temperature map of the item. In the flow diagram, the operations are summarized in individual blocks. Depending on implementation, the exemplary method 1400 may be performed by hardware, or combinations of hardware, software, firmware, etc., for example, by components of the exemplary control unit 130.

At block 1402, a heatability property of an item in a microwave chamber is sensed along each of multiple beam paths from at least two sides of the item. A beam array controller 654 can administer microwave power along beam paths where paired sensors can determine an interaction of the microwave power with the item being heated.

At block 1404, isothermal regions in the interior of the item are 3-dimensionally mapped based on the sensing. The thermal mapping engine 628 can input the sensed power information and provide a thermal map of the item being heated.

Figure 15:
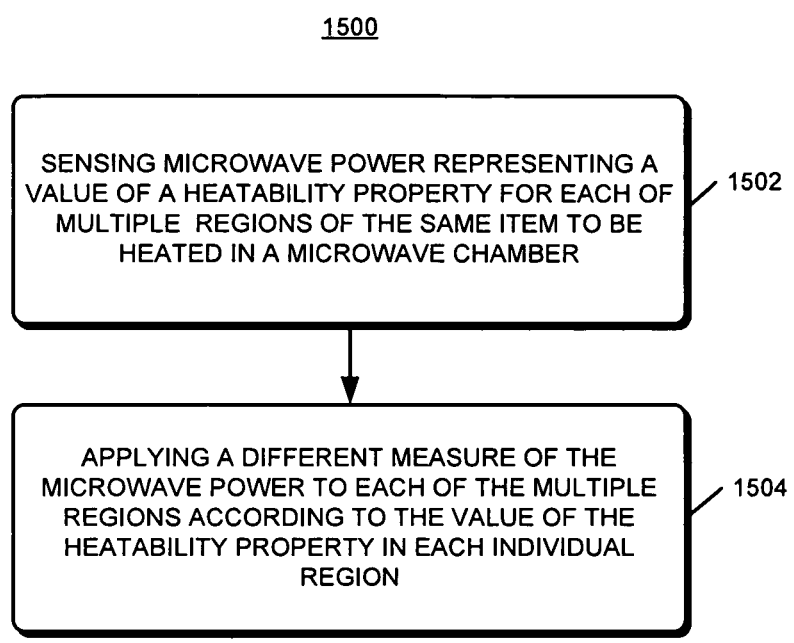
FIG. 15 is a flow diagram of an exemplary method of separately sensing, separately modeling, and separately heating multiple regions of the same item in a microwave chamber.

FIG. 15 is a flow diagram of an exemplary method 1500 of separately sensing, separately modeling, and separately heating multiple regions of the same item in a microwave chamber. In the flow diagram, the operations are summarized in individual blocks. Depending on implementation, the exemplary method 1500 may be performed by hardware, or combinations of hardware, software, firmware, etc., for example, by components of the exemplary control unit 130.

At block 1502, microwave power representing a value of a heatability property for each of multiple regions of the same item is sensed, e.g, by a dynamically controlled array of microwave detector diodes.

At block 1504, a different measure of the microwave power is applied to each of different regions according to the value of the heatability property in each individual region. The multiple beam path manager 608 can custom apply microwave power to each region as modeled by the region modeler 618 of the controller 146.

Figure 16:
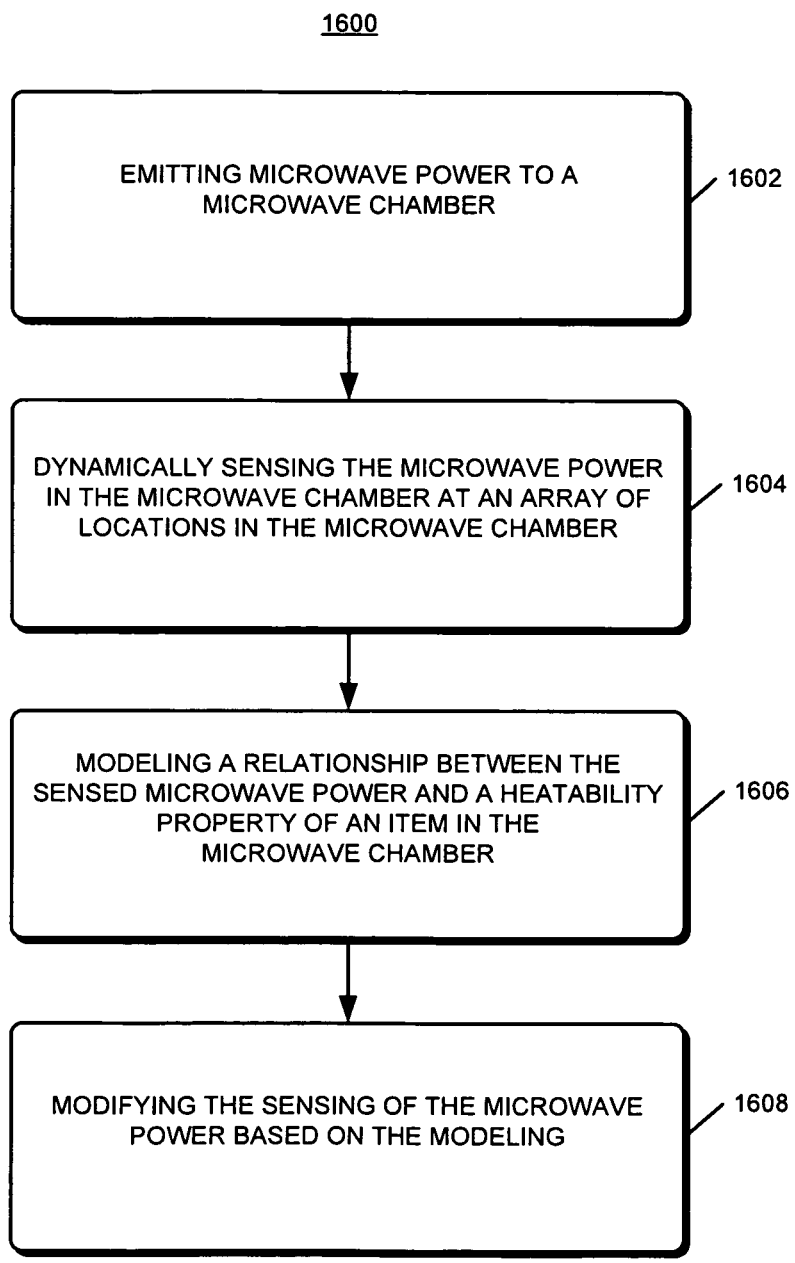
FIG. 16 is a flow diagram of an exemplary method of modifying microwave power sensing based on modeling a heatability property of the item.

FIG. 16 is a flow diagram of an exemplary method 1600 of modifying microwave power sensing based on modeling a heatability property of the item. In the flow diagram, the operations are summarized in individual blocks. Depending on implementation, the exemplary method 1600 may be performed by hardware, or combinations of hardware, software, firmware, etc., for example, by components of the exemplary control unit 130.

At block 1602, microwave power is emitted to a microwave chamber, e.g., by an array of magnetrons built into one or more sides of the microwave chamber.

At block 1604, the microwave power is dynamically sensed in the microwave chamber at an array of locations in the microwave chamber. Typically an array of radiation detectors are arranged on each of two sides of the microwave chamber, although the radiation sensors may be stationed anywhere in the microwave chamber that is practical.

At block 1606, a relationship between the sensed microwave power and a heatability property of an item in the microwave chamber is modeled, e.g., by the modeling engine 602.

At block 1608, the sensing of the microwave power is modified, based on the modeling. In one implementation, the controller 146 may change the active sensors in an array of sensors, or change the sensitivity of certain sensors to microwave power; or change the frequency of microwave energy sensed by certain detectors. This allows the radiation detectors to more optimally sense a heating property parameter being modeled in order to optimize heating or cooking in the microwave chamber.

Figure 17:
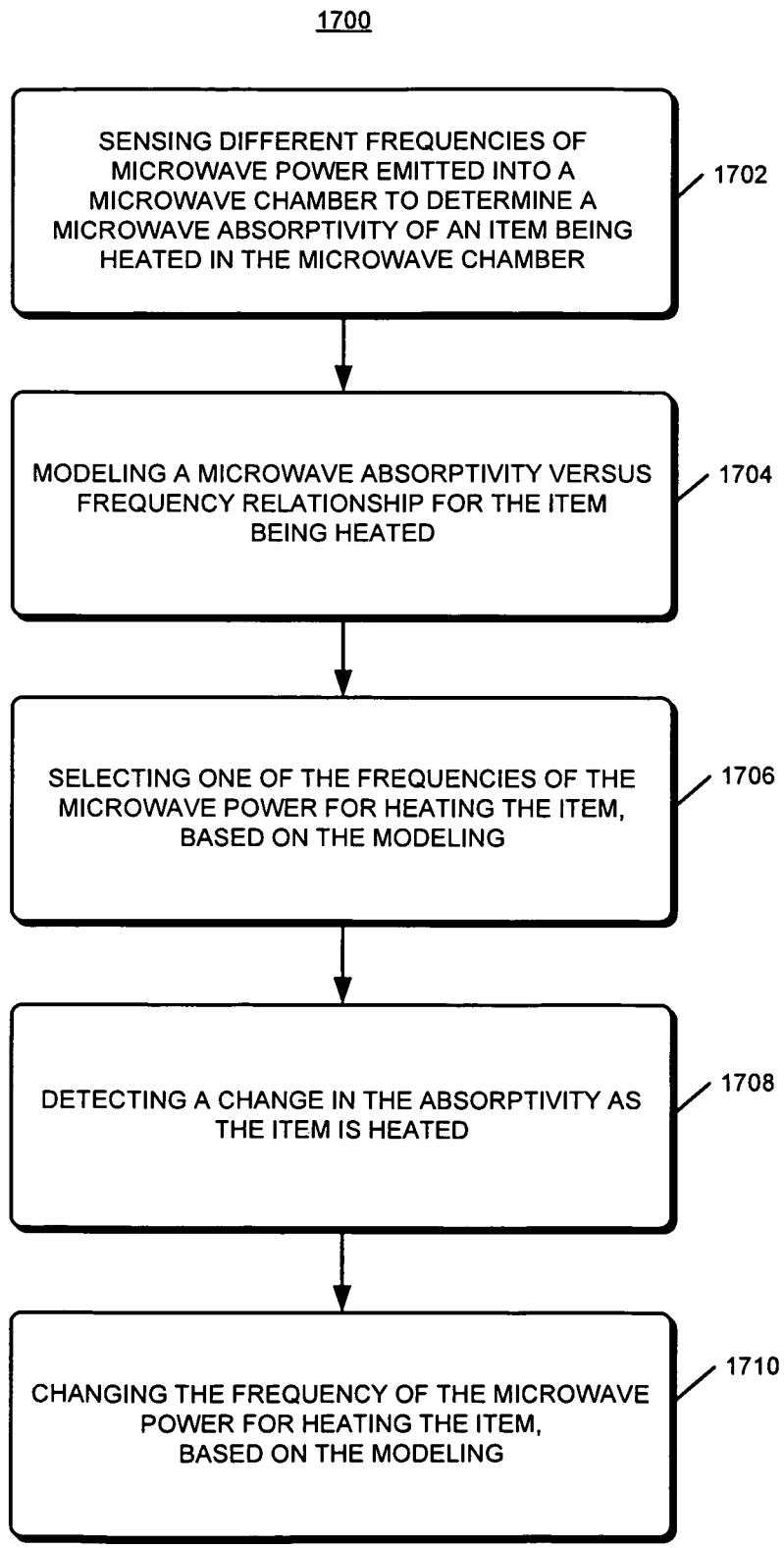
FIG. 17 is a flow diagram of an exemplary method of dynamically sensing and assigning a current frequency for microwave power to heat an item that has changing microwave absorptivity.

FIG. 17 is a flow diagram of an exemplary method 1700 of dynamically sensing and assigning a current frequency for microwave power to heat an item that possesses changing microwave absorptivity. In the flow diagram, the operations are summarized in individual blocks. Depending on implementation, the exemplary method 1700 may be performed by hardware, or combinations of hardware, software, firmware, etc., for example, by components of the exemplary control unit 130.

At block 1702, different frequencies of microwave power emitted into a microwave chamber to determine a microwave absorptivity of an item being heated in the microwave chamber are sensed.

At block 1704, a microwave absoptivity versus frequency relationship for the item being heated is modeled. The modeling engine 602 can update a model that relates a heatability property of the item to a characteristic of the microwave power being sensed in real time.

At block 1706, one of the frequencies of the microwave power is selected based on the modeling. For example, the frequency of microwave power that was maximally absorbed by the item may be selected by the beam frequency controller 660 to shorten the heating or cooking time.

At block 1708, a change in the absorptivity as the item is heated is detected. The sensed power interpreter 606 includes a beam differentiator 642 and a sensed power comparator 644 that can distinguish fine changes in the microwave power being absorbed by the item being heated.

At block 1710, the frequency of the microwave power for heating the item is changed, based on the modeling. The relationship set up by the modeling engine 602 can be used to select the optimal frequency for fast-cooking an item or slow-cooking an item. Or the modeling engine 602 can select multiple frequencies to be applied to multiple microwave beam paths in order to cook one region of a food item at one speed and another region of the food item at another speed.

Conclusion

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described above. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electromechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electromechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electromechanical systems include but are not limited to a variety of consumer electronics systems, medical devices, as well as other systems such as motorized transport systems, factory automation systems, security systems, and/or communication/computing systems. Those skilled in the art will recognize that electromechanical as used herein is not necessarily limited to a system that has both electrical and mechanical actuation except as context may dictate otherwise.

Those skilled in the art will recognize that it is common within the art to implement devices and/or processes and/or systems, and thereafter use engineering and/or other practices to integrate such implemented devices and/or processes and/ or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory.

For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude use of the system in another territory.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention claimed is:

1. A method, comprising:
   emitting microwave power to a microwave chamber;
   dynamically sensing the microwave power in the microwave chamber at an array of locations in the microwave chamber, including at least sensing one or more power levels of at least two microwave beam paths;
   modeling a relationship between the sensed microwave power and a heatability property of at least one item in the microwave chamber, including at least determining, using a triangulation engine and based on the one or more sensed power levels of the at least two microwave beam paths, at least one location of the at least one item; and
   controlling the emitting of the microwave power based on the modeling, including at least changing a direction vector of one or more microwave beam paths at least one of towards or away from the at least one location of the at least one item.

2. The method as recited in claim 1, wherein dynamically sensing the microwave power in the microwave chamber at an array of locations in the microwave chamber, including at least sensing one or more power levels of at least two microwave beam paths comprises:
detecting an intensity of the microwave power.

3. The method as recited in claim 1, wherein dynamically sensing the microwave power in the microwave chamber at an array of locations in the microwave chamber, including at least sensing one or more power levels of at least two microwave beam paths comprises:
detecting a frequency of the microwave power.

4. The method as recited in claim 1, wherein dynamically sensing the microwave power in the microwave chamber at an array of locations in the microwave chamber, including at least sensing one or more power levels of at least two microwave beam paths comprises:
detecting a duration of the microwave power.

5. The method as recited in claim 1, wherein emitting microwave power to a microwave chamber comprises:
transferring the microwave power to the microwave chamber via multiple beam paths, wherein each beam path has an origin on one side of the at least one item and a termination on an opposing side of the at least one item; and
wherein dynamically sensing the microwave power in the microwave chamber at an array of locations in the microwave chamber, including at least sensing one or more power levels of at least two microwave beam paths includes at least:
sensing at least part of the microwave power on a termination side of each beam path.

6. The method as recited in claim 5, further comprising:
redirecting at least one of the beam paths from a first target location in the microwave chamber to a second target location in the microwave chamber.

7. The method as recited in claim 6, wherein redirecting at least one of the beam paths from a first target location in the microwave chamber to a second target location in the microwave chamber comprises:
switching from a first emitter to a second emitter in an array of microwave emitters to change a beam path from one part of the microwave chamber to another part of the microwave chamber; and
sensing the microwave power associated with a termination side of each beam path.

8. The method as recited in claim 6, wherein redirecting at least one of the beam paths from a first target location in the microwave chamber to a second target location in the microwave chamber comprises:
changing a position of a metallic vane to reflect microwaves associated with an emitter emitting the microwave power for at least one of the beam paths.

9. The method as recited in claim 5, further comprising:
scanning the microwave chamber for a presence of the at least one item, wherein at least one beam path is redirectable to different parts of the microwave chamber; and
wherein sensing at least part of the microwave power on a termination side of each beam path includes at least:
detecting an attenuation of the microwave power associated with each beam path that is intersected by the at least one item.

10. The method as recited in claim 9, wherein scanning the microwave chamber for a presence of the at least one item comprises:
determining a shape and a geometry of the at least one item.

11. The method as recited in claim 9, wherein scanning the microwave chamber for a presence of the at least one item comprises:
differentiating multiple items in the microwave chamber, including determining a unique shape and geometry of each item.

12. The method as recited in claim 9, wherein scanning the microwave chamber for a presence of the at least one item comprises:
directing the multiple beam paths through the microwave chamber from at least two different sides of the microwave chamber to sense a 3-dimensional shape and geometry of the at least one item.

13. The method as recited in claim 1, wherein dynamically sensing the microwave power in the microwave chamber at an array of locations in the microwave chamber, including at least sensing one or more power levels of at least two microwave beam paths comprises:
sensing the microwave power in the microwave chamber at multiple locations to one side of the at least one item.

14. The method as recited in claim 13, wherein sensing the microwave power in the microwave chamber at multiple locations to one side of the at least one item comprises:
sensing the microwave power at each termination of a beam path.

15. The method as recited in claim 13, wherein sensing the microwave power in the microwave chamber at multiple locations to one side of the at least one item comprises:
sensing the microwave power at an array of locations on one or more sides of the microwave chamber.

16. The method as recited in claim 15, wherein sensing the microwave power at an array of locations on one or more sides of the microwave chamber comprises:
sensing the microwave power at an array of locations that has a higher number of sensors than a number of emitters in an array of emitters for emitting the microwave power for the multiple beam paths, to provide increased sensing resolution.

17. The method as recited in claim 13, further comprising:
emitting a first measure of the microwave power to the microwave chamber for a first interval;
turning off the emitting;
for a second interval, sensing a second measure of the microwave power as an emission of radiation from the at least one item, wherein the microwave power absorbed by the at least one item spontaneously radiates from the at least one item; and
mapping isothermal regions of the at least one item based on the sensed microwave power.

18. The method as recited in claim 17, further comprising:
sensing the second measure of the microwave power at different sensor arrays disposed on at least two different sides of the at least one item; and
mapping one or more 3-dimensional isothermal regions in the interior of the at least one item based on the sensing the second measure of the microwave power at different sensor arrays disposed on at least two different sides of the at least one item.

19. The method as recited in claim 18, further comprising:
sensing an infrared image of one or more surfaces of the at least one item;
mapping isothermal areas of one or more surfaces of the at least one item based on the infrared image; and associating the isothermal regions in the interior of the at least one item with the isothermal areas on the one or more surfaces of the at least one item.

20. The method as recited in claim 19, further comprising:
refining the mapping of the isothermal regions in the interior of the at least one item based on the associating the isothermal regions in the interior of the at least one item with the isothermal areas on the one or more surfaces of the at least one item.

21. The method as recited in claim 13, further comprising:
sensing an optical depth of the at least one item along each of multiple beam paths;
associating each sensed optical depth with a local absorptivity of the at least one item;
associating each local absorptivity with a temperature; and
mapping isothermal regions in the interior of the at least one item based on the sensing.

22. The method as recited in claim 21, wherein sensing an optical depth of the at least one item along each of multiple beam paths comprises:
sensing an optical depth of the at least one item along each of multiple beam paths from at least two sides of the at least one item; and
wherein mapping isothermal regions in the interior of the at least one item based on the sensing includes at least:
3-dimensional mapping isothermal regions in the interior of the at least one item based on the sensing.

23. The method as recited in claim 13, further comprising:
sensing a power level of at least two beam paths of the microwave power; and
triangulating a location of an interior isothermal region of the at least one item, wherein the interior isothermal region varies in temperature beyond a threshold from an adjacent region in the at least one item.

24. The method as recited in claim 23, wherein the interior isothermal region has a temperature lower than its surrounding regions, the method further comprising:
directing a microwave beam path to the interior isothermal region to heat the interior isothermal region.

25. The method as recited in claim 23, wherein the interior isothermal region has a temperature higher than its surrounding regions, the method further comprising:
directing a beam path away from the interior isothermal region to cool the interior isothermal region.

26. The method as recited in claim 13, wherein sensing the microwave power in the microwave chamber at multiple locations to one side of the at least one item comprises:
differentially sensing microwave beam paths, including at least:
assigning a microwave frequency to each emitter that emits the microwave power for a beam path; and
sensing the microwave frequency of each beam path at multiple locations in the microwave chamber.

27. The method as recited in claim 26, further comprising:
sensing a first optical depth of a surface layer of the at least one item, wherein the first optical depth is associated with a first microwave frequency assigned to a first beam path;
sensing a second optical depth of a non-surface layer of the at least one item, wherein the second optical depth is associated with a second microwave frequency assigned to a second beam path;
heating the surface layer via the first beam path using the first microwave frequency; and
heating the non-surface layer via the second beam path using the second microwave frequency.

28. The method as recited in claim 1, wherein modeling a relationship between the sensed microwave power and a heatability property of at least one item in the microwave chamber comprises:
determining, using at least one of a triangulation engine, a 3-D position calculator, or a multiple beam path manager, and based on the one or more sensed power levels of the at least two microwave beam paths, at least one location of the at least one item.

29. The method as recited in claim 1, wherein modeling a relationship between the sensed microwave power and a heatability property of at least one item in the microwave chamber, including at least determining, using a triangulation engine and based on the one or more sensed power levels of the at least two microwave beam paths, at least one location of the at least one item comprises:
modeling a relationship between the sensed microwave power and a heatability property of at least one item in the microwave chamber, including at least determining, using at least one of a triangulation engine, a 3-D position calculator, or a multiple beam path manager, and based on the one or more sensed power levels of the at least two microwave beam paths, at least one location of the at least one item.

30. The method as recited in claim 1, wherein modeling a relationship between the sensed microwave power and a heatability property of at least one item in the microwave chamber comprises:
modeling a relationship between the sensed microwave power and a heatability property of at least one item in the microwave chamber, including at least determining, using at least one of a triangulation engine, a 3-D position calculator, or a multiple beam path manager, and based on the one or more sensed power levels of the at least two microwave beam paths, at least one location of the at least one item.

31. The method as recited in claim 1, wherein modeling a relationship between the sensed microwave power and a heatability property of at least one item in the microwave chamber, including at least determining, using a triangulation engine and based on the one or more sensed power levels of the at least two microwave beam paths, at least one location of the at least one item comprises:
determining, using at least one of a triangulation engine, a 3-D position calculator, or a multiple beam path manager, and based on the one or more sensed power levels of the at least two microwave beam paths, at least one location of the at least one item.

32. The method as recited in claim 1, wherein determining, using a triangulation engine and based on the one or more sensed power levels of the at least two microwave beam paths, at least one location of the at least one item comprises:
determining, using at least one of a triangulation engine, a 3-D position calculator, or a multiple beam path manager, and based on the one or more sensed power levels of the at least two microwave beam paths, at least one location of the at least one item.

33. The method as recited in claim 1, wherein changing a direction vector of one or more microwave beam paths at least one of towards or away from the at least one location of the at least one item comprises:
changing at least one of (i) at least one power level of one or more microwave beams, including at least one of increasing or decreasing microwave power at the at least one location of the at least one item; or (ii) at least one direction vector of one or more microwave beams, including at least moving one or more microwave beams at least one of towards or away from the at least one location of the at least one item.

34. The method as recited in claim 1, wherein modeling a relationship between the sensed microwave power and a heatability property of at least one item in the microwave chamber comprises:
relating the sensed microwave power to a microwave absorptivity of the at least one item.

35. The method as recited in claim 1, wherein modeling a relationship between the sensed microwave power and a heatability property of at least one item in the microwave chamber comprises:
relating the sensed microwave power to an optical depth of the at least one item.

36. The method as recited in claim 1, wherein modeling a relationship between the sensed microwave power and a heatability property of at least one item in the microwave chamber comprises:
relating the sensed microwave power to a temperature of the at least one item.

37. The method as recited in claim 1, wherein modeling a relationship between the sensed microwave power and a heatability property of at least one item in the microwave chamber comprises:
relating the sensed microwave power to a dielectric property of the at least one item.

38. The method as recited in claim 1, wherein modeling a relationship between the sensed microwave power and a heatability property of at least one item in the microwave chamber comprises:
relating the sensed microwave power to a physical state of at least one of a carbohydrate, a protein, or a fat in the at least one item.

39. The method as recited in claim 1, wherein modeling a relationship between the sensed microwave power and a heatability property of at least one item in the microwave chamber comprises:
relating the sensed microwave power to a liquid food state of the at least one item.

40. The method as recited in claim 1, wherein modeling a relationship between the sensed microwave power and a heatability property of at least one item in the microwave chamber comprises:
relating the sensed microwave power to a moisture content of the at least one item.

41. The method as recited in claim 1, wherein modeling a relationship between the sensed microwave power and a heatability property of at least one item in the microwave chamber comprises:
relating the sensed microwave power to a physical geometry of the at least one item.

42. The method as recited in claim 1, wherein modeling a relationship between the sensed microwave power and a heatability property of at least one item in the microwave chamber comprises:
relating the sensed microwave power to a type of food of the at least one item.

43. The method as recited in claim 1, wherein modeling a relationship between the sensed microwave power and a heatability property of at least one item in the microwave chamber comprises:
selecting a type of modeling based on a sensed microwave power.

44. The method as recited in claim 1, further comprising:
estimating a food type, including at least:
sensing the microwave power in the microwave chamber to estimate a geometry of the at least one item;
sensing the microwave power in the microwave chamber to estimate an optical depth of the at least one item; and
estimating a food type of the at least one item based on the geometry and the optical depth.

45. The method as recited in claim 44, further comprising:
sensing the microwave power in the microwave chamber to estimate a food type and temperature of the at least one item; and
wherein estimating a food type of the at least one item based on the geometry and the optical depth includes at least:
estimating a food type of the at least one item based on the geometry and the optical depth at a given temperature.

46. The method as recited in claim 45, further comprising:
estimating the temperature of the at least one item from the optical depth.

47. The method as recited in claim 1, further comprising:
iteratively sensing the microwave power in the microwave chamber at the array of locations in the microwave chamber and controlling the emitting of the microwave power based on modeling the relationship between the sensed microwave power and a heatability property of at least one item in the microwave chamber.

48. The method as recited in claim 1, further comprising:
dynamically changing the sensing based on one or more changes in at least one of the emitting, the modeling, or the controlling.

49. The method as recited in claim 1, wherein sensing the microwave power in the microwave chamber at an array of locations in the microwave chamber, including at least sensing one or more power levels of at least two microwave beam paths comprises:
sensing different frequencies of the microwave power in the microwave chamber;
modeling a microwave absorptivity versus frequency relationship for a given at least one item being heated; and
selecting one of the frequencies of the microwave power for heating the at least one item, based on the modeling.

50. The method as recited in claim 49, further comprising:
sensing the microwave power in the microwave chamber at the selected frequency;
detecting a change in the absorptivity as the at least one item is heated; and
changing the frequency of the microwave power for heating the at least one item when the absorptivity changes, based on the modeling.

51. The method as recited in claim 1, further comprising:
estimating one or more of a size or geometry of the at least one item in the microwave chamber based at least in part on the one or more sensed power levels of the at least two microwave beam paths.

52. The method as recited in claim 51, wherein estimating one or more of a size or geometry of the at least one item in the microwave chamber based at least in part on the one or more sensed power levels of the at least two microwave beam paths comprises:
integrating one or more microwave shadows formed behind the at least one item in the microwave chamber, the microwave shadows formed by the microwave beam paths at least partially blocked by the at least one item, to estimate one or more of a size or geometry of the at least one item in the microwave chamber.

53. The method as recited in claim 1, wherein controlling the emitting of the microwave power based on the modeling, including at least changing a direction vector of one or more microwave beam paths at least one of towards or away from the at least one location of the at least one item comprises:

controlling the emitting of the microwave power based on the modeling, including at least directing one or more modes at least one of towards or away from the at least one location of the at least one item.

54. The method as recited in claim 53, wherein controlling the emitting of the microwave power based on the modeling, including at least directing one or more modes at least one of towards or away from the at least one location of the at least one item comprises:

controlling the emitting of the microwave power based on the modeling, including at least directing two or more microwave beams to coincide at a particular point or region.

\* \* \* \* \*